(12) United States Patent
Bhamidipati et al.

(10) Patent No.: US 11,263,315 B2
(45) Date of Patent: *Mar. 1, 2022

(54) SYSTEM LEVEL FUNCTION BASED ACCESS CONTROL FOR SMART CONTRACT EXECUTION ON A BLOCKCHAIN

(71) Applicant: eBay Inc., San Jose, CA (US)

(72) Inventors: Venkata Siva Vijayendra Bhamidipati, Milpitas, CA (US); Michael Chan, Cupertino, CA (US); Derek Chamorro, Austin, TX (US); Arpit Jain, Milpitas, CA (US); Ashok Srinivasa Murthy, Fremont, CA (US)

(73) Assignee: eBay Inc., San Jose, CA (US)

( * ) Notice: Subject to any disclaimer, the term of this patent is extended or adjusted under 35 U.S.C. 154(b) by 229 days.

This patent is subject to a terminal disclaimer.

(21) Appl. No.: 16/429,656

(22) Filed: Jun. 3, 2019

(65) Prior Publication Data

US 2020/0175155 A1 Jun. 4, 2020

Related U.S. Application Data

(60) Provisional application No. 62/774,799, filed on Dec. 3, 2018.

(51) Int. Cl.
*G06F 21/54* (2013.01)
*G06Q 20/40* (2012.01)
(Continued)

(52) U.S. Cl.
CPC .......... *G06F 21/54* (2013.01); *G06Q 20/3678* (2013.01); *G06Q 20/405* (2013.01); *H04L 9/0637* (2013.01)

(58) Field of Classification Search
CPC ...... G06F 21/54; G06F 21/64; G06F 11/0793; G06F 11/0706; G06F 11/079;
(Continued)

(56) References Cited

U.S. PATENT DOCUMENTS 10,671,380 B2 * 6/2020 Shao ..................... G06F 8/70
2009/0313609 A1 12/2009 Ackerman et al.
(Continued)

FOREIGN PATENT DOCUMENTS

EP 3346415 A2 7/2018
WO 2017/021153 A1 2/2017
(Continued)

OTHER PUBLICATIONS

International Search Report received for PCT Application No. PCT/US2019/036636, dated Sep. 25, 2019, 3 pages.
(Continued)

*Primary Examiner* — Abu S Sholeman
(74) *Attorney, Agent, or Firm* — Shook, Hardy & Bacon L.L.P.

(57) ABSTRACT

Technologies are shown for system level function based access control for smart contract execution on a blockchain. Access control rules control function calls at a system level by utilizing function boundary detection instrumentation in a kernel that executes smart contracts. The detection instrumentation generates a call stack that represents a chain of function calls in the kernel for execution of a smart contract. The access control rules are applied to the function call stack to allow or prohibit specific functions or function call chains. Access control rules can also define allowed or prohibited parameter data in the function call chain. If the function call chain or parameters do not meet the requirements defined in the access control rules, then the function call can be blocked from executing or completing execution. The access control rules can produce sophisticated access control policies based on complex function call chains.

14 Claims, 13 Drawing Sheets

(51) Int. Cl.
   *G06Q 20/36* (2012.01)
   *H04L 9/06* (2006.01)
(58) Field of Classification Search
   CPC .......... G06F 11/0751; G06F 17/30896; G06F 17/30905; G06Q 20/405; G06Q 20/3678; H04L 9/0637; H04L 63/123; H04L 2209/38; H04L 9/3239
   See application file for complete search history.

(56) References Cited

U.S. PATENT DOCUMENTS

| | | | |
|---|---|---|---|
| 2010/0031312 | A1 | 2/2010 | Dixit |
| 2010/0053785 | A1 | 6/2010 | Keromytis et al. |
| 2013/0276056 | A1* | 10/2013 | Epstein .............. G06F 9/45558 726/1 |
| 2014/0289705 | A1 | 9/2014 | Lu et al. |
| 2014/0337822 | A1 | 11/2014 | Puthuff |
| 2016/0300060 | A1 | 10/2016 | Pike et al. |
| 2017/0083701 | A1 | 3/2017 | Tajalli et al. |
| 2017/0124324 | A1 | 5/2017 | Peleg et al. |
| 2017/0140408 | A1 | 5/2017 | Wuehler |
| 2017/0242773 | A1* | 8/2017 | Cirne .................. G06F 11/079 |
| 2017/0279774 | A1* | 9/2017 | Booz .................. G06Q 20/123 |
| 2017/0279818 | A1 | 9/2017 | Milazzo et al. |
| 2018/0181751 | A1 | 6/2018 | Jagadeesan et al. |
| 2018/0316778 | A1 | 11/2018 | Tucker et al. |
| 2018/0349893 | A1 | 12/2018 | Tsai |
| 2019/0207759 | A1 | 7/2019 | Chan et al. |
| 2019/0324882 | A1* | 10/2019 | Borello .............. G06F 9/45558 |
| 2019/0370141 | A1* | 12/2019 | Choi .................. G06F 11/3075 |
| 2020/0175156 | A1 | 6/2020 | Bhamidipati et al. |
| 2020/0177372 | A1 | 6/2020 | Bhamidipati et al. |
| 2021/0050989 | A1 | 2/2021 | Kempf et al. |

FOREIGN PATENT DOCUMENTS

| | | |
|---|---|---|
| WO | 2019/072305 A2 | 4/2019 |
| WO | 2020/117314 A1 | 6/2020 |

OTHER PUBLICATIONS

International Written Opinion received for PCT Application No. PCT/US2019/036636, dated Sep. 25, 2019, 5 pages.
Github,"BCC—Tools for BPF-based Linux IO analysis, networking, monitoring, and more", retrieved from the internet <https://github.com/iovisor/bcc>, last accessed on Jan. 8, 2020, Jan. 8, 2020, 6 pages.
Github,"Cilium/bpf.rst at Master", Retrieved from the internet: <https://github.com/cilium/cilium/blob/master/Documentation/bpf.rst>, last accessed on Jan. 8, 2020, Dec. 16, 2019, 102 pages.
Goldman,"The Verge Hack, Explained—The Abacus Crypto Journal", Time Warps, Mining Exploits, Denial of Service, and More, May 15, 2018, 8 pages.
Gregg,"eBPF: One Small Step", Brendan Gregg's Blog, retrieved from the internet: <http://www.brendangregg.com/blog/2015-05-15/ebpf-one-small-step.html>, May 15, 2015, 7 pages.
Gregg,"Golang bcc/BPF Function Tracing", Brendan Gregg's Blog, retrieved from the internet: <http://www.brendangregg.com/blog/2017-01-31/golang-bcc-bpf-function-tracing.html>, Jan. 31, 2017, 9 pages.
Gregg,"Linux perf Examples", Retrieved from the Internet: <http://www.brendangregg.com/perf.html>, accessed on Jan. 8, 2020, Sep. 25, 2019, 40 pages.
Qureshi,"A hacker stole $31M of Ether—how it happened, and what it means for Ethereum", retrieved from the internet: <https://www.freecodecamp.org/news/a-hacker-stole-31m-of-ether-how-it-happened-and-what-it-means-for-ethereum-9e5dc29e33ce/>, accessed on Jan. 8, 2020, Jul. 20, 2017, 19 pages.
Xu et al., "A Taxonomy of Blockchain-Based Systems for Architecture Design", School of Computer Science and Engineering, 2017, 10 pages.
Steichen, et al., "Blockchain-Based, Decentralized Access Control for IPFS", Retrieved from the Internet URL <https://www.researchgate.net/publication/327034734>, Jul. 2018, 9 pages.
Zhang, et al., "Smart Conliact-Based Access Control for the Internet of Things", Feb. 13, 2018, pp. 1-11.
Hyperledger Fabric, Retrieved from the Internet URL :<https://hyperledger-fabric.readthedocs.io/en/release-1.4/whatis.html-Hyperledger Fabric >, Accessed on Aug. 9, 2021, 8 pages.
Introduction to SELinux, Retrieved from internet URL: http://web.mit.edu/rhel-doc/5/RHEL-5-manual/Deployment_Guide-en-US/ch-selinux.html, Accessed on Aug. 5, 2021, 6 Pages.
Seccomp BPF (SECure COMPuting with filters), The Linux kernel user-space API guide, Retrieved from internet URL https://www.kernel.org/doc/html/latest/userspace-api/seccomp_filter.html, 7 Pages.
First Action Interview Pre-Interview Communication Received for U.S. Appl. No. 16/698,210, dated May 25, 2021, 33 Pages.
Bhamidipati et al., "Instrumentation, Resource Allocation and Monitoring for smart contracts on the Blockchain", Hyperledger Summit 2018, The Linux Foundation, Dec. 27, 2018, 39 Pages.
Condon et al., "Parity Wallet Hack 2: Electric Boogaloo", Hackemoon, Retrieved from Internet URL: https://hackernoon.com/parity-wallet-hack-2-electric-boogaloo-e493f2365303, Nov. 8, 2017, 12 pages.
Dey, "Securing Majority-Attack in Blockchain Using Machine Learning and Algorithmic Game Theory: A Proof of Work", School of Computer Science and Electronic Engineering, University of Essex, Colchester, UK, Retrieved from internet URL: https://www.arxiv-vanity.com/papers/1806.05477/, 2018, 9 pages.
Fleming, "A thorough introduction to eBPF", Retrieved from internet URL: https://lwn.net/Articles/740157/, Dec. 2, 2017, 8 pages.
Hertig, "Blockchain's Once-Feared 51% Attack Is Now Becoming Regular", Retrieved from internet URL: https://www.coindesk.com/blockchains-feared-51-attack-now-becoming-regular, Jun. 8, 2018, 16 Pages.
Outchakoucht, "Dynamic Access Control Policy based on Blockchain and Machine Learning for the Internet of Things", (IJACSA) International Journal of Advanced Computer Science and Applications, vol. 8, No. 7, 2017, pp. 417-424.
Palladino, "The Parity Wallet Hack Explained", https://blog.zeppelin.solutions/on-the-parity-wallet-multisig-hack-405a8c12e8f7, Jul. 19, 2017, 6 pages.
Passing et al., "NTrace: Function boundary tracing for Windows on IA-32", 16th Working Conference on Reverse Engineering. IEEE, 2009, 10 pages.
International Preliminary Report on Patentability Received for PCT Patent Application No. PCT/US2019/036636, dated Jun. 17, 2021, 8 Pages.
Scholz et al., "Performance implications of packet filtering with Linux eBPF", 30th International Teletraffic Congress (ITC 30). vol. 1. IEEE, 2018, 9 pages.
Smalley et al., "Implementing SELinux as a Linux Security Module", NSA contract MDA904-01-C-0926, NAI Labs Report #01-043, Dec. 2001, 58 Pages.
Smart Contracts, "Introducing Clarity, a language for predictable smart contracts", https://blog.blockstack.org/introducing-clarity-the-language-for-predictable-smart-contracts/, Accessed on Aug. 9, 2021, 4 pages.
Wood, "Ethereum: A secure decentralized generalized transaction ledger byzantium version", Jul. 11, 2021, 40 pages.
Non-Final Office Action received for U.S. Appl. No. 16/656,892, dated Aug. 12, 2021, 42 pages.
Seccomp BPF (SECure COMPuting with filters), The Linux kernel user-space API guide, Retrieved from internet URL https://www.kernel.org/doc/html/latest/userspace-api/seccomp_filter.html, Accessed on Oct. 12, 2021, 8 Pages.
Notice of Allowance Received for U.S. Appl. No. 16/698,210, dated Oct. 1, 2021, 13 Pages.

* cited by examiner

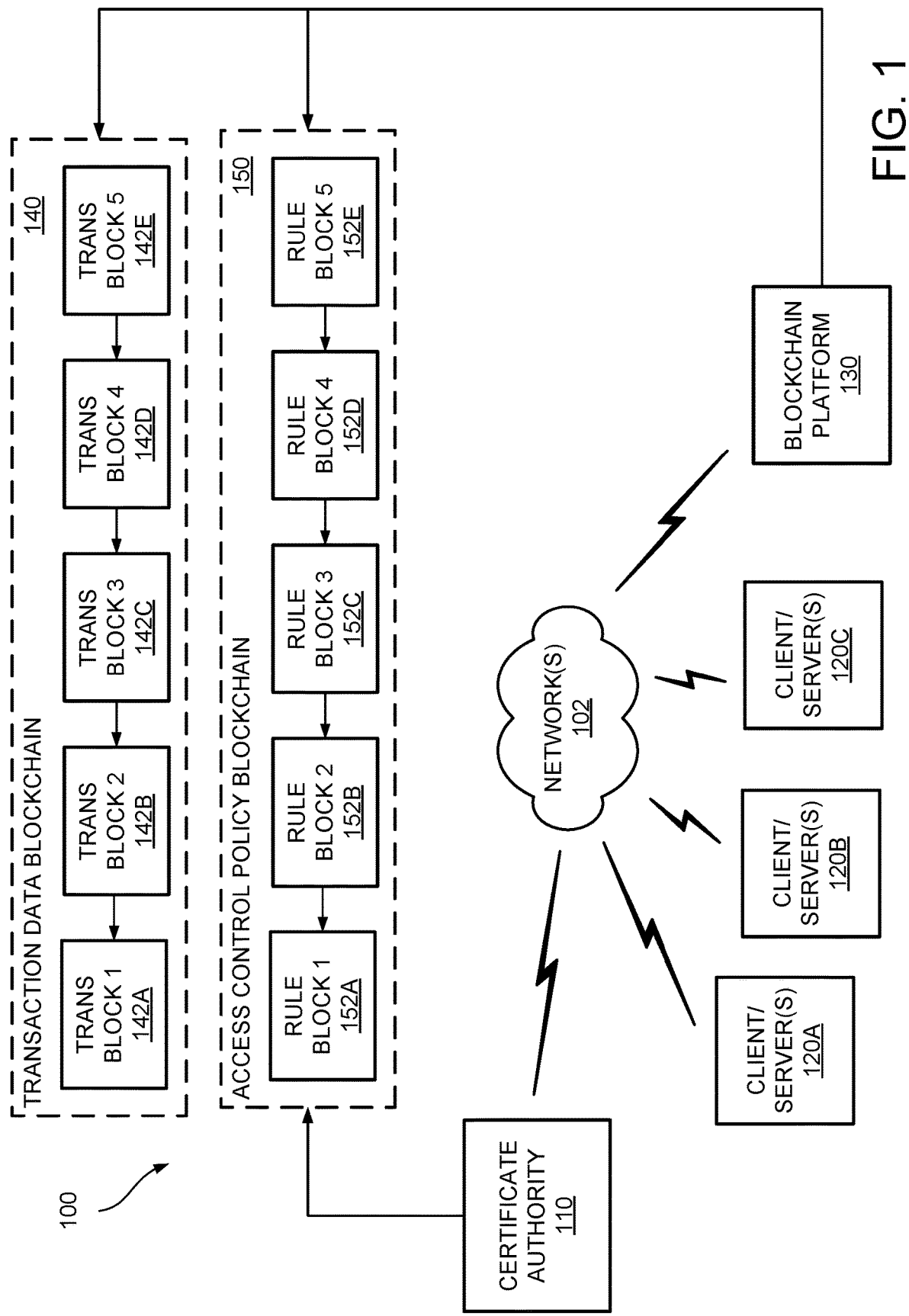

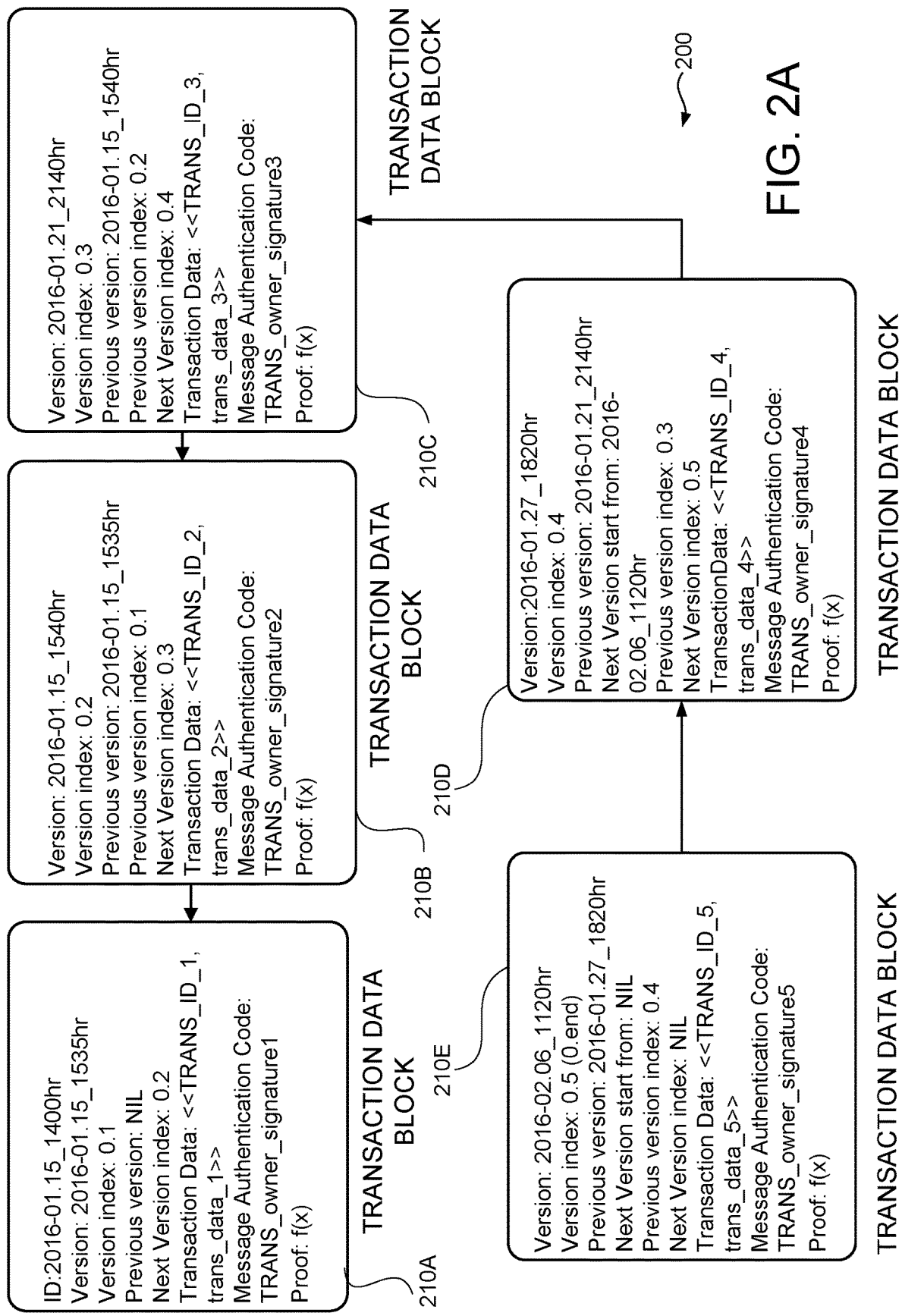

```
TRANSACTION DATA BLOCK                              242

METHODS

Transaction_ID
Transaction_data

Function_1(trans_ID, trans_data_A, trans_data_B) /* Main function
that calls other functions */
{
        Function_2(trans_data_A, trans_data_B)
}

Function_2(trans_data_A, trans_data_B) /* Called by main function
and calls other functions */
{
        Function_3(trans_data_B)
}

Function_3(trans_data_B)
{
        Function_4()
}

Function_4()
{
        processing
}
```

FIG. 2B

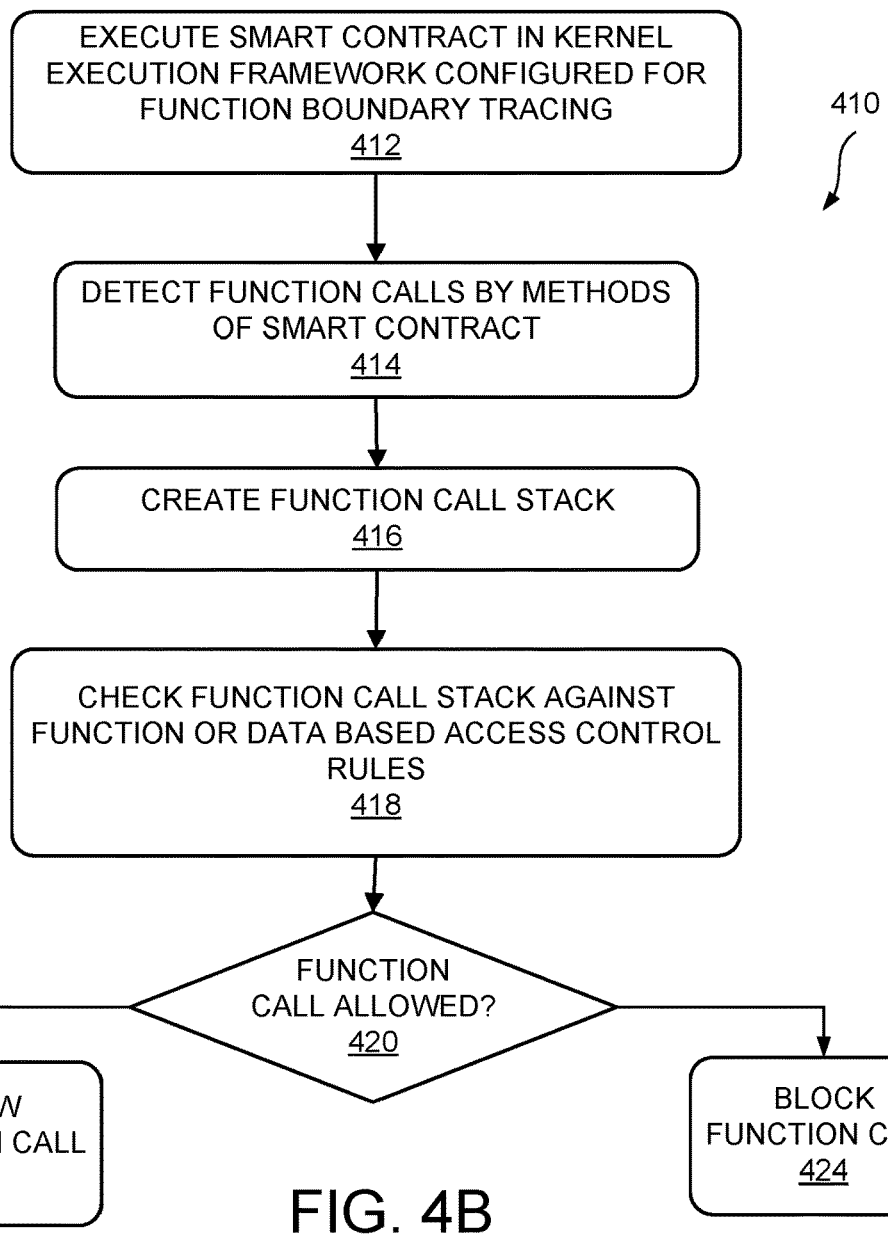

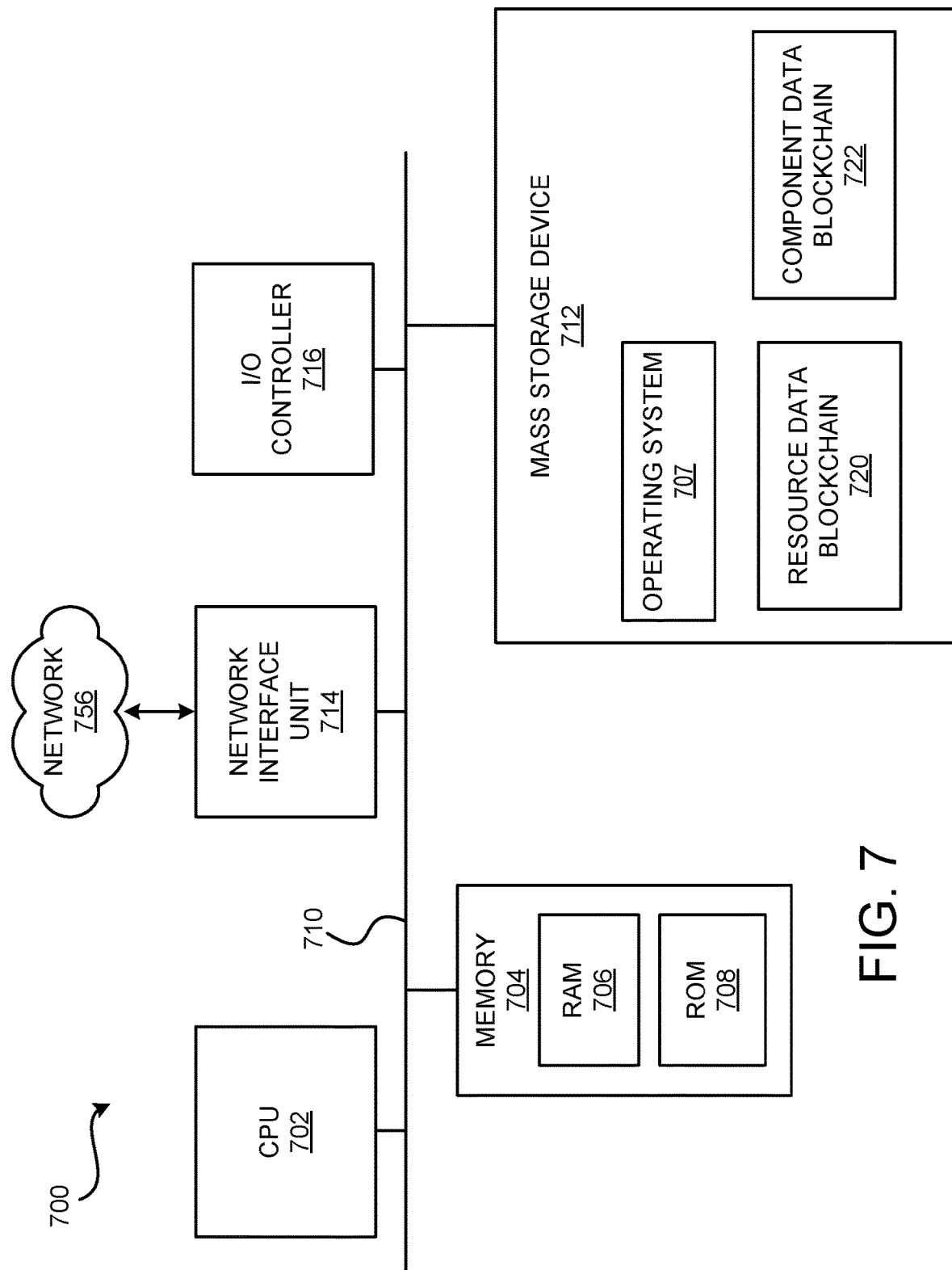

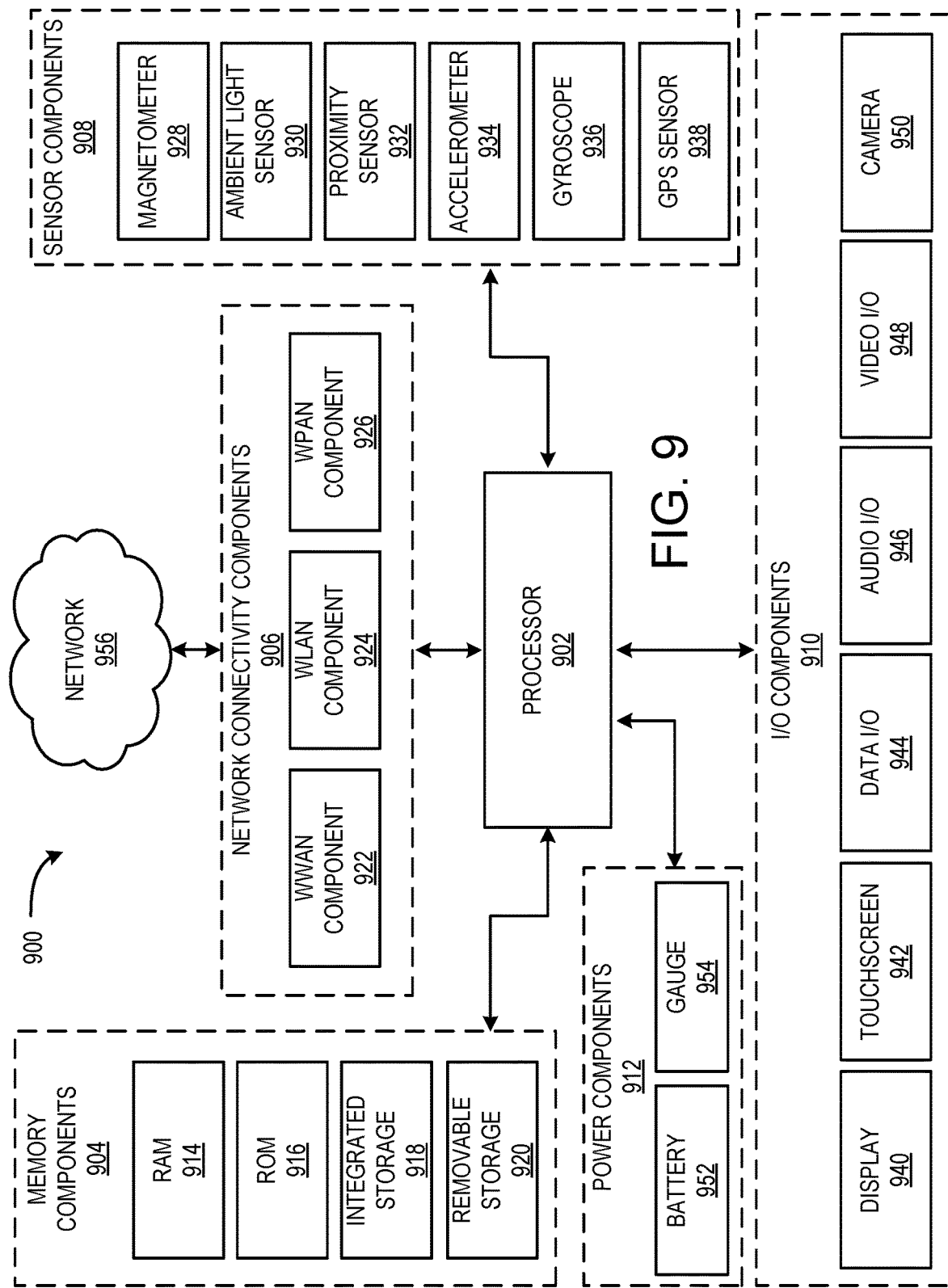

SYSTEM LEVEL FUNCTION BASED ACCESS CONTROL FOR SMART CONTRACT EXECUTION ON A BLOCKCHAIN

CROSS REFERENCE TO RELATED APPLICATIONS

This application claims the benefit of U.S. Provisional Patent Appl. No. 62/774,799 for "INTEGRATION OF FUNCTION BASED ACCESS CONTROL, DATA BASED ACCESS CONTROL, AND INSTRUMENTATION FRAMEWORKS TO BLOCKCHAIN DATA STRUCTURES" filed Dec. 3, 2018, herein incorporated by reference in its entirety for all purposes.

BACKGROUND

Blockchains generally provide decentralized distributed ledgers to securely and immutably record transactions and other data. Currently, there are several approaches to maintaining security in blockchains.

One aspect of blockchain security is obtained by Proof of Work, which are typically cryptographic puzzles with dynamic levels of difficulty. Proof of Work generally ensures that it is computationally infeasible for a single party to rewrite the blockchain with its own entries. For public blockchains, this also allows a winning node to be selected that can append a new transaction block to a blockchain.

Another aspect of blockchain security is the use of consensus protocols that act as gatekeepers to authorize a "miner" to write to the blockchain. These protocols are typically of two types: 1) cryptographic computational with very low collision probability to ensure that only one writer wins within a time period; and 2) non-cryptographic protocols, such as Proof of elapsed Time (PoET), Asynchronous Byzantine Fault Tolerance (aBFT), Practical Byzantine Fault Tolerance (pBFT), or Hashgraph augmented parallel consensus protocols.

Yet another aspect of blockchain security is the use of private keys by all blockchain actors, e.g. users, contracts, signers/validators/miners. Each of these entities protect their private keys assiduously in a software or hardware framework, such as digital wallet systems like METAMASK, TREZOR, or the LEDGER NANO series.

However, none of the security approaches above serves effectively as security gatekeepers for the operations of the blockchain platform itself or for smart contracts deployed on the blockchain. If a blockchain is coded with doorways (either inadvertently, by design, or due to bugs), or if the execution environment that the blockchain platform provides to run smart contracts is compromised, then a blockchain may be vulnerable to security breaches. As a consequence, smart contracts on some blockchains have been hacked and funds stolen.

For example, the ETHEREUM blockchain supported a fallback function for smart contracts that was always executed at the end of the smart contract. This fallback function was exploited by hackers to drain wallets by inserting a Deposit( ) call from the smart contract wallet into a wallet controlled by the hackers.

It is with respect to these and other considerations that the disclosure made herein is presented.

SUMMARY

Technologies are disclosed for system level function based access control for smart contract execution on a blockchain.

Examples of the disclosed technology concern methods, systems and media for system level function based access control for smart contract execution on a blockchain, in a kernel execution framework for smart contract execution on a blockchain, where the kernel execution framework is configured to perform function boundary detection involve detecting a function call by one or more methods of a smart contract on the blockchain, adding the function call to a function call stack for the smart contract; checking the function call stack against a set of function based access control rules that defines one or more permitted or prohibited sequences of function calls, and, if the function call stack includes one or more function calls that are not permitted under the set of function based access control rules, then blocking execution or completion of the function call.

In certain examples, the function call stack includes each function called during execution of the smart contract, the set of function based access control rules includes at least one access control rule that defines a sequence of function calls, and the step of checking the function call stack against the set of function based access control rules includes checking the function call stack against the sequence of function calls defined in the access control rule that defines a sequence of function calls.

In certain other examples, the set of function based access control rules includes at least one data based access control rule and the step of detecting a function call by one or more methods of a smart contract on the blockchain includes detecting at least one value included in the function call stack. The step of checking the function call stack against a set of function based access control rules involves checking the value included in the function call stack against the data based access control rule. The step of blocking the function call if the sequence of function calls is not permitted under the set of function based access control rules includes blocking the function call if the value included in the sequence of function calls is not permitted under the set of data based access control rules.

In particular examples, the set of function based access control rules is stored on a blockchain and the method includes modifying the set of function based access control rules by adding a function based access control rule block to the blockchain.

In still other examples, the kernel execution framework is a Linux operating system framework and the function boundary detection comprises extended Berkeley Packet Filtering. In certain examples, the set of function based access control rules includes at least one of a white list of allowed sequences of function calls and a black list of prohibited sequences of function calls.

In yet another example, the steps of detecting a function call by one or more methods of a smart contract on the blockchain, adding the function call to a function call stack for the smart contract, checking the function call stack against the set of function based access control rules, and blocking the function if the function call is not permitted under the set of function based access control rules are performed within a virtual machine executing the framework for execution of the smart contract on the blockchain.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings. This Summary is provided to introduce a selection of concepts in a simplified form that are further described below in the Detailed Description.

This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items.

FIG. 1 is an architectural diagram showing an illustrative example of a system for a storing transaction data using a blockchain and storing access control rules using a blockchain;

FIG. 2A is a data architecture diagram showing an illustrative example of a transaction data blockchain securing transaction data;

FIG. 2B is a data architecture diagram showing an illustrative example of a transaction data block securing transaction data that includes methods that are executed by a blockchain platform;

FIG. 4A is a control flow diagram showing an illustrative example of a process for defining sets of function or data based access control rules in accordance with the disclosed technology;

FIG. 4B is a control flow diagram showing an illustrative example of a process in accordance with the disclosed technology for applying function or data based access control rules to function calls in a call stack in a kernel instrumented with function boundary access control;

FIG. 7 is a computer architecture diagram illustrating an illustrative computer hardware and software architecture for a computing system capable of implementing aspects of the techniques and technologies presented herein;

FIG. 9 is a computer architecture diagram illustrating a computing device architecture for a computing device capable of implementing aspects of the techniques and technologies presented herein.

DETAILED DESCRIPTION

Figure 3A:
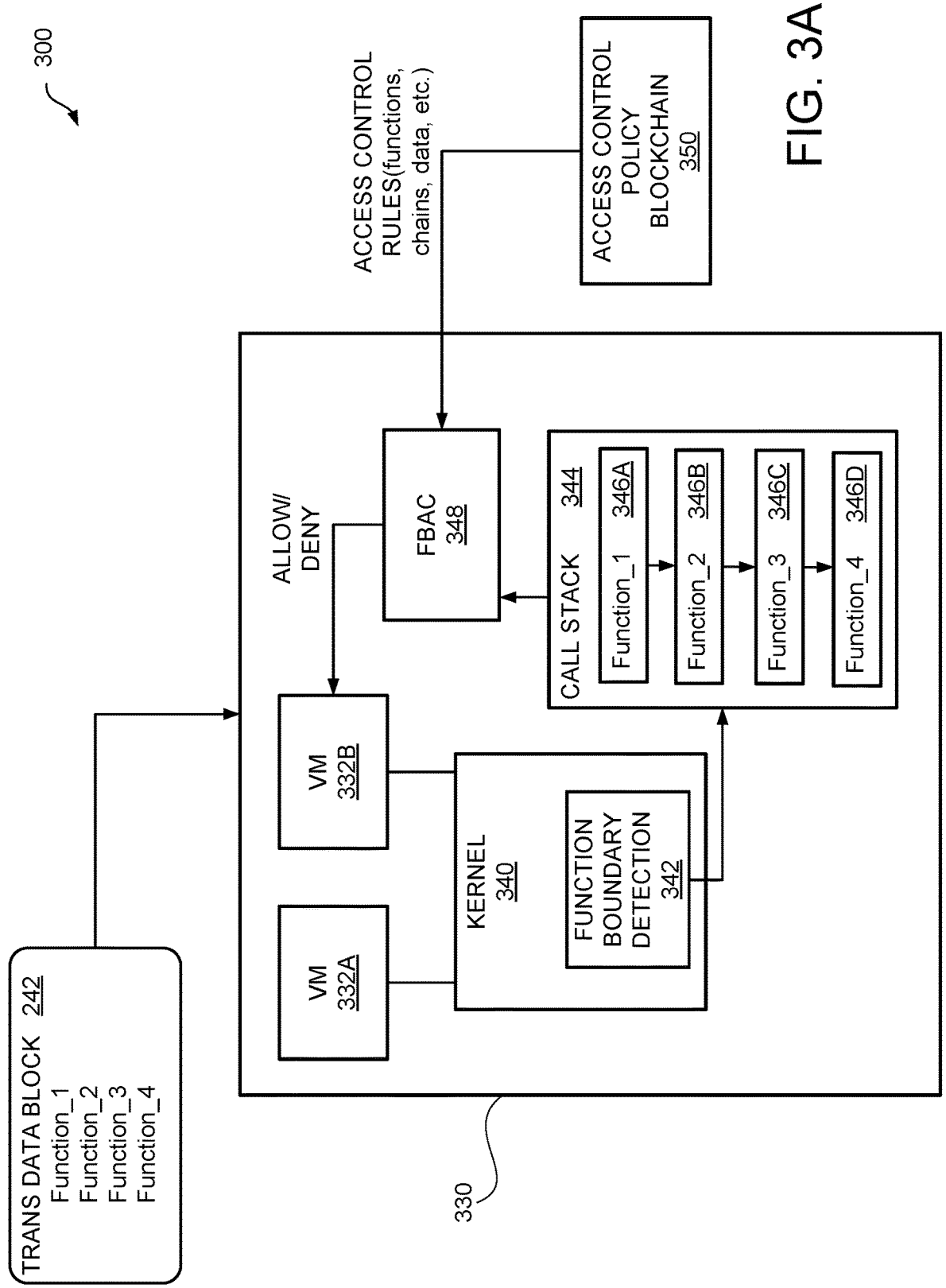
FIG. 3A is a functional block diagram showing an illustrative example of a blockchain platform with virtual machines that execute methods from a transaction data block in a kernel instrumented with function boundary access control in accordance with the disclosed technology.

In the context of blockchain security, it can be advantageous to utilize function based access control (FBAC) in accordance with the disclosed technology to improve the security of blockchain operations on a blockchain platform.

A security framework utilizing FBAC in accordance with the disclosed technology can operate at a function call level in a kernel executing blockchain methods on the blockchain platform to significantly improve the security of blockchains at a system level in addition to the cryptographic and consensus security approaches typically utilized in blockchains.

One technical advantage of certain aspects of the system level security of the disclosed technology is that smart contracts or blocks already deployed to a blockchain, and which are, therefore, immutable, can be protected without editing or redeploying the smart contracts or blocks. Because the disclosed technology provides security at the system level, it can be highly extensible and easily configurable.

Another technical advantage of certain aspects of the disclosed technology is that function and data based access control rules can be directed to checking chains of function calls in a call stack instead of being limited to checking a single function call.

The access control rules themselves can also be stored on a blockchain and secured by the multi-signature cryptographic and consensus security approaches utilized by the blockchain. Storing access control rules on a blockchain permits the rules to be audited and traced to their origin. Updates to the access control rules can also be stored on the blockchain and the disclosed technology can be configured to obtain the most recent rules for use in the FBAC security framework.

Because the access control rules are generally static data rather than executable code, the rules themselves are highly resistant to exploitation. By contrast, executable code in smart contracts or blocks can be vulnerable to exploits in an underlying virtual machine (VM) that executes the smart contract code.

The access control rules can be realized in some implementations by an addendum to the VM in a blockchain platform that executes smart contracts. In other implementations, the access control rules are read in from a blockchain to a standalone privileged system level module.

In general, the FBAC framework of the disclosed technology can prevent invocation of specific smart contracts, specific smart contract function chains, and blockchain infrastructure functions. The FBAC framework makes it possible to define roles and bindings at various levels, such as functions, contracts, channels, or consensus algorithms. The FBAC framework may be used in some instances to sandbox algorithms that are used in a blockchain platform, which can help ensure uniformity of configuration, for example, among nodes with different consensus algorithms.

In general terms, the FBAC framework of the disclosed technology utilizes function boundary detection instrumentation in a kernel of a blockchain platform. The function boundary detection instrumentation can trace when a function has been entered and exited in the kernel. One example of function boundary detection instrumentation is the Berkeley Packet Filter (eBPF) framework in the LINUX operating system.

The FBAC framework of the disclosed technology can, in some implementations, utilize system level support to run. For example, in one embodiment, the FBAC framework may run in its own privileged VM that runs the FBAC and can exercise control over the VMs that run smart contracts. In another embodiment however, the same VM can run both smart contracts and the FBAC. The VM may also use an underlying operating system's function boundary detection instrumentation support, e.g. eBPF.

Multiple FBAC policies can be associated, or pivoted, with multiple entities. For example, a wallet address on a blockchain for financial transactional entries may be associated. For enterprise transactions, this pivot can be specified as a field within each FBAC policy. After storing an FBAC policy in a blockchain, each peer, validator, or transaction initiator in the blockchain may have a uniform view of the policies.

As noted above, the access control rules can be both function and data based. Data passed as function parameters can be monitored to control access based on the parameters. The data based access control rules can be stored in a blockchain. Data based access control rules can be used, for example, to shield certain data sections of a blockchain from general access. For example, in a permissioned blockchain, marker or keys can be utilized to determine access to data.

As discussed above, hackers were able to exploit a fallback function in a smart contract by inserting a Deposit( ) call that directed funds in a compromised wallet to a wallet controlled by the hackers. In one example, the disclosed technology can be used to prevent such an exploit using an access control rule that prohibits a Deposit( ) call at the end of a chain of function calls.

Another example of a possible use of the disclosed technology is permissioned blockchains. Current blockchain platforms achieve different permissioned views for different participants by segregating the messaging and access to data across channels. However, some smart contracts may end up being shared across hundreds of entities. The disclosed technology may be applied to define access control rules that determine the functions that different users, e.g. user, user admin, group admin, cluster admin, logical grouping admin.

Yet another example of a possible use of the disclosed technology is to provide Quality of Service (QoS) in a blockchain platform. The disclosed technology can be utilized to apply access control rules to implement differential resource allocation on a highly granular level to deliver a desired QoS for a particular entity or functionality.

Still another example of a possible use of the disclosed technology is resource or rate limit enforcement. Function chains that are invoked can be identified through the framework, their resource utilization constantly updated, and based on that, or, based on a fixed count per time period, access control rules applied to enforce resource or rate limits.

Another example of a possible use of the disclosed technology is to implement circuit breakers. For example, when a smart contract malfunctions because of underlying bugs or similar issues, or due to external failures, such as networking I/O issues or similar, it will error out. If a particular function chain is repeatedly invoked, and it is known to be failing constantly, then a circuit breaker can be useful. Access control rules are applied to implement a circuit breaker function in this context by preventing further invocation of the function chain until a prescribed/preset time has elapsed. This may be especially useful in preventing a blockchain platform from getting overwhelmed. In a larger distributed systems context, at scale, this may help achieve optimal blockchain request routing.

One other example of a possible use of the disclosed technology is to prevent spoofing of smart contracts. By defining FBAC polices that determine permissible function chains, any other function chain can be invalidated by applying an access control rule to terminate its execution. Spoofing of critical path functions or generic smart contracts can be prevented at the system level in case they get forged by defining access control rules that require certain internal function calls that are native to the underlying blockchain in such a way that it renders the forged smart contract or critical path function incapable of doing something it should not be doing. When coupled with a root of trust that can be obtained from access control rules defined on a blockchain, function invocation chains can be made more fool proof.

In general terms, the disclosed technology utilizes one or more sets of access control rules or policies to control function calls at a system level by utilizing function boundary detection instrumentation in a kernel. The function boundary detection instrumentation can generate a function call stack that represents a chain of function calls in the kernel. The access control rules can be applied to the function call stack to allow or prohibit specific function call chains. If the function call chain or parameters do not meet the requirements defined in the access control rules, then the function call can be blocked or terminated. The access control rules can be defined to produce sophisticated access control policies based on complex function call chains and data parameters.

The following Detailed Description describes technologies for function based access control at a system level in a blockchain platform utilizing access control rules. The access control rules can be maintained on a blockchain for security, accessibility and immutability.

Note that, in some scenarios, different entities can provide the access control rules. For example, a Certificate Authority or other trusted source can be utilized to own and control the access control rules. In some examples, modifications or additions to the access control rules can be stored in additional access control rule blocks on a blockchain that require a signature of the trusted entity.

The resulting access control rule blocks can provide a record of the access control rules or policy defined for a blockchain platform or VM and provide a traceable and auditable history of the access control rules.

A technical advantage of the disclosed function based access control technology includes securely controlling access at a system level. Another technical advantage of the disclosed function based access control technology is its ability to control complex function call chains. Yet another technical advantage of the disclosed function based access control is the distributed nature of the blockchain, which prevents an unauthorized entity from modifying or corrupting the access control rules at any single point. Other technical effects other than those mentioned herein can also be realized from implementation of the technologies disclosed herein.

As will be described in more detail herein, it can be appreciated that implementations of the techniques and technologies described herein may include the use of solid state circuits, digital logic circuits, computer components, and/or software executing on one or more input devices.

Signals described herein may include analog and/or digital signals for communicating a changed state of the data file or other information pertaining to the data file.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including multiprocessor systems, mainframe computers, microprocessor-based or programmable consumer electronics, minicomputers, hand-held devices, and the like.

In the following detailed description, references are made to the accompanying drawings that form a part hereof, and in which are shown by way of illustration specific configurations or examples. Referring now to the drawings, in which like numerals represent like elements throughout the several figures, aspects of a computing system, computer-readable storage medium, and computer-implemented methodologies for function based access control at a system level will be described. As will be described in more detail below with respect to the figures, there are a number of applications and services that may embody the functionality and techniques described herein.

FIG. 1 is an architectural diagram showing an illustrative example of a system architecture 100 wherein a blockchain platform 130 maintains a transaction data blockchain 140 that can be accessed via a wide area network 102. In this example, the blockchain platform 130 also maintains an access control policy blockchain 150 that stores access control rules that can be utilized in the disclosed function based access control technology. Access control rules are applied at a system level during execution of functions in the transaction data blocks 142 of transaction data blockchain 140 to perform function based access control.

In the embodiment of FIG. 1, blockchains 140 and 150 can each be a publicly available blockchain that supports scripting, such as the ETHEREUM blockchain, which supports a SOLIDITY scripting language, or BITCOIN, which supports a scripting language called SCRIPT. Blockchains 140 and 150 can also each be a private blockchain, or a combination of public and private blockchains can be utilized. Transaction data blocks 142 and access control rule blocks 152 can also reside on the same blockchain.

In this example, a Certificate Authority is a trust entity that controls the access control policy blockchain 150. The Certificate Authority can add or modify the access control policy by adding access control rule blocks 152 to blockchain 150 that add, delete or modify access control rules. The access control rule blocks 152 require the cryptographic signature of the Certificate Authority to be valid.

A Certificate Authority 110, such as a client device, one or more servers, or remote computing resources, is controlled by a trusted entity that creates the access control rules. In one example, Certificate Authority 110 initiates an access control policy blockchain 150 by creating genesis block 152A. In other examples, the transaction data blocks 142 and access control rule blocks 152 can be added to an existing blockchain.

The transaction data blockchain can be utilized to securely store different types of data in transaction data blocks 142, such as data pertaining to transactions or other data suitable for storage on a blockchain ledger. A transaction data block 142 can include methods or function calls that are executed by blockchain platform 130.

For access control policy blockchain 150, access control rule blocks 152 can include access control rules for a domain, blockchain platform service, enterprise or other entity that wishes to apply the disclosed function based access control to the execution of methods in smart contracts.

In some embodiments, the Certificate Authority 110 can be replaced by another computing node, such as a computer on a peer-to-peer network, or other computing device.

In the example of FIG. 1, the transaction data block is generated by an entity that owns a transaction and the block is secured on transaction data blockchain 140. The transaction data stored in transaction data blocks 142 can relate to transactions performed by entities, such as client/servers 120A, 120B or 120C. In this example, the client/servers 120 can communicate with Certificate Authority 110 as well as a network of servers for blockchain platform 130 that supports and maintains blockchains 140 and 150. For example, the ETHEREUM blockchain platform from the ETHEREUM FOUNDATION of Switzerland provides a decentralized, distributed computing platform and operating system that provides scripting functionality.

In one example, Certificate Authority 110 owns and controls the access control rule blocks 152 in access control policy blockchain 150. Each access control rule block 152 includes one or more access control rules relating to function calls that are allowed or prohibited in blockchain platform 130. When access control rules are defined, the Certificate Authority 110 creates an access control rule block 152 containing the access control rules and links it to access control policy blockchain 150. When access control rules are added, modified or deleted, a new access control rule block 152 is created that incorporates the changes and the new block 152 is signed by Certificate Authority 110 and linked to the previous access control rule block in the access control policy blockchain 150.

Although Certificate Authority 110 maintains control over the access control rules, the access control policy blockchain 150 can be made accessible to other entities, such as client/servers 120, so that these entities can identify, trace or audit the relevant access control rules stored in the blocks in the blockchain 150. Also, the access control rules in blockchain 150 can be accessed by blockchain platform 130 to order to apply the access control rules to perform the disclosed function based access control.

In some examples, the access control policy blockchain 150 may be viewable to other entities through the use of applications that can access blockchain information. By providing access to the access control policy blockchain 150, this approach allows users to readily access control rules maintained on the access control policy blockchain 150 under the control of the trusted entity, e.g. the user of Certificate Authority 110.

In another example, aspects of the access control policy blockchain 150 may be restricted to being viewable only to entities that are authorized to access the blockchain 150, such as Certificate Authority 110 and blockchain platform 130.

FIG. 2A is a data architecture diagram illustrating a simplified example of a transaction data blockchain ledger 200 based on the blocks 142A-E of the transaction data blockchain ledger 140 of FIG. 1. The transaction data blockchain ledger 200 example of FIG. 2A is simplified to show block headers, metadata and signatures of blocks 210A-E in order to demonstrate storage of transaction data using a blockchain. In outline, a blockchain ledger may be a globally shared transactional database. Signatures can, in some examples, involve all or part of the data stored in the data the blocks 142A-E and can also involve public key addresses corresponding to resource origination entities involved in the creation of resources.

The blockchain ledger 200 may be arranged as a Merkle tree data structure, as a linked list, or as any similar data structure that allows for cryptographic integrity. The blockchain ledger 200 allows for verification that the transaction data, and similarly access control rule on access control policy blockchain 150, has not been corrupted or tampered with because any attempt to tamper will change a Message Authentication Code (or has) of a block, and other blocks pointing to that block will be out of correspondence. In one embodiment of FIG. 2A, each block may point to another block. Each block may include a pointer to the other block, and a hash (or Message Authentication Code function) of the other block.

Each block in the blockchain ledger may optionally contain a proof data field. The proof data field may indicate a reward that is due. The proof may be a proof of work, a proof of stake, a proof of research, or any other data field indicating a reward is due. For example, a proof of work may indicate that computational work was performed. As another example, a proof of stake may indicate that an amount of cryptocurrency has been held for a certain amount of time. For example, if 10 units of cryptocurrency have been held for 10 days, a proof of stake may indicate 10*10=100 time units have accrued. A proof of research may indicate that research has been performed. In one example, a proof of research may indicate that a certain amount of computational work has been performed—such as exploring whether molecules interact a certain way during a computational search for an efficacious drug compound.

The blocks 210 of transaction data blockchain 200 in the example of FIG. 2A shows securing transaction data with a new transaction data block on the blockchain. In one example, a transaction entity, such as a user of client/servers 120 of FIG. 1, provides a transaction identifier and transaction data for the transaction when it creates transaction data block 210A. The transaction entity signs the transaction data block 210A and the blockchain system within which blockchain 200 is created verifies the transaction data block based on a proof function.

Note that the access control policy blockchain 150 illustrated in FIG. 1 can take a similar form with access control rule blocks 152 that includes access control rules. Access control rule blocks 152 for successive additions, modifications or deletions can be linked together on the same or a different blockchain such that a history of the access control rules is immutably and traceably stored using a blockchain.

Note that a variety of approaches may be utilized that remain consistent with the disclosed technology. In some examples relating to access control rules, the user of Certificate Authority 110 is a required entity or the only entity permitted to verify or validate access control rule blocks 152. In other examples, other entities, such as system administrators who define access control rules, is a required entity to verify or validate access control rule blocks 152.

In the example of FIG. 2A, transaction data blocks 210 of transaction data blockchain 200 include transaction identifiers and transaction data along with a signature of an entity that owns the transaction. To add another transaction data block for another transaction, a transaction entity creates transaction data block 210B, which identifies the transaction and includes the transaction data. The transaction entity signs transaction data block 210B and commits block 210B to blockchain 200 for verification by the blockchain platform.

To add more transaction data blocks for an additional transactions, the same or another transaction entity creates transaction data block 210C to secure transaction data for transaction TRANS_ID_3 along with data for the transaction. Similarly, transaction data block 242D is created by another transaction entity to store the transaction data for transaction TRANS_ID_4 and transaction data block 242E is created to store the transaction data for TRANS_ID_5.

The transaction data blocks 142 can be smart contracts that include methods or functions that are executed by the blockchain platform 130. FIG. 2B is a data architecture diagram showing an illustrative example of a transaction data block 142 with functions that are executed by a blockchain platform or framework. For example, the functions Function_1, Function_2, Function_3, and Function_4 can be executed by a VM operating in blockchain platform 130. Access control policy blockchain, such as blockchain 150 in FIG. 1 enables access control rules to be securely stored to maintain access control policy that can be utilized for the function based access control of the disclosed technology. The access control rules are obtained from the blockchain 150 and applied to function calls in the VM at a system level.

FIG. 3A is a functional block diagram illustrating an example of the function based access control of the disclosed technology being applied to the function calls in transaction data block 242 being executed in blockchain platform 330. In this example, blockchain platform 330 includes VMs 332A and 332B that are executing in kernel 340 and executing the function calls from transaction data block 242.

Kernel 340 includes function boundary detection instrumentation 342, such as eBPF, that detects when a function is entered or exits and creates call stack 344 to represent a chain of function calls 346. In this example, call stack 344 includes a call stack for the functions calls in the execution of transaction data block 242 from Function_1 to Function_2, Function_2 to Function_3, and Function_3 to Function_4.

Blockchain platform 330 includes function boundary access control module 348, which, in this example, obtains access control rules from blockchain 350 and applies the rules to the function call chain in call stack 344. When a function boundary is detected by function boundary detection instrumentation 342, FBAC 348 applies the access control rules to the call stack 344 to determine whether the function should be blocked and sends a signal to, in this example, VM 332B to allow or deny execution or completion of the function.

Note that FBAC module 346 utilizes system level support to run. In some examples, it can be its own privileged VM that runs the FBAC functionality and can exercise control over the other VMs, e.g. VMs 332A and 332B, that run the smart contracts, e.g. transaction data block 242. In other examples, however, the same VM can run both the smart contracts and the FBAC functionality. In either example, the VM will use the function boundary detection instrumentation 342 in the kernel of the underlying operating system.

As noted above, the access control rules of the FBAC policies can be stored in a blockchain much like a smart contract and backed by the same multisignature cryptographic signature methods currently used by blockchain frameworks to ensure that deployed access control rules are trackable to their origins. Updates of policies can also be coded into the blockchain so that only the latest policies are applied dynamically by the FBAC module 348. By maintaining the FBAC policies on the blockchain itself, they are automatically immutably secured. Since these policies are static and not code that gets executed, they themselves cannot be hacked or exploited, unlike smart contracts, which are as vulnerable as the VM executing the smart contract.

In differing implementations, the FBAC policies can be realized by an addendum to the VM that executes the smart contracts, or as a standalone privileged system level module that can only be programmed by FBAC rules/policies that are read in from the blockchain. In either implementation, no back door is available in the FBAC module for exploitation by malicious actors.

Figure 3B:
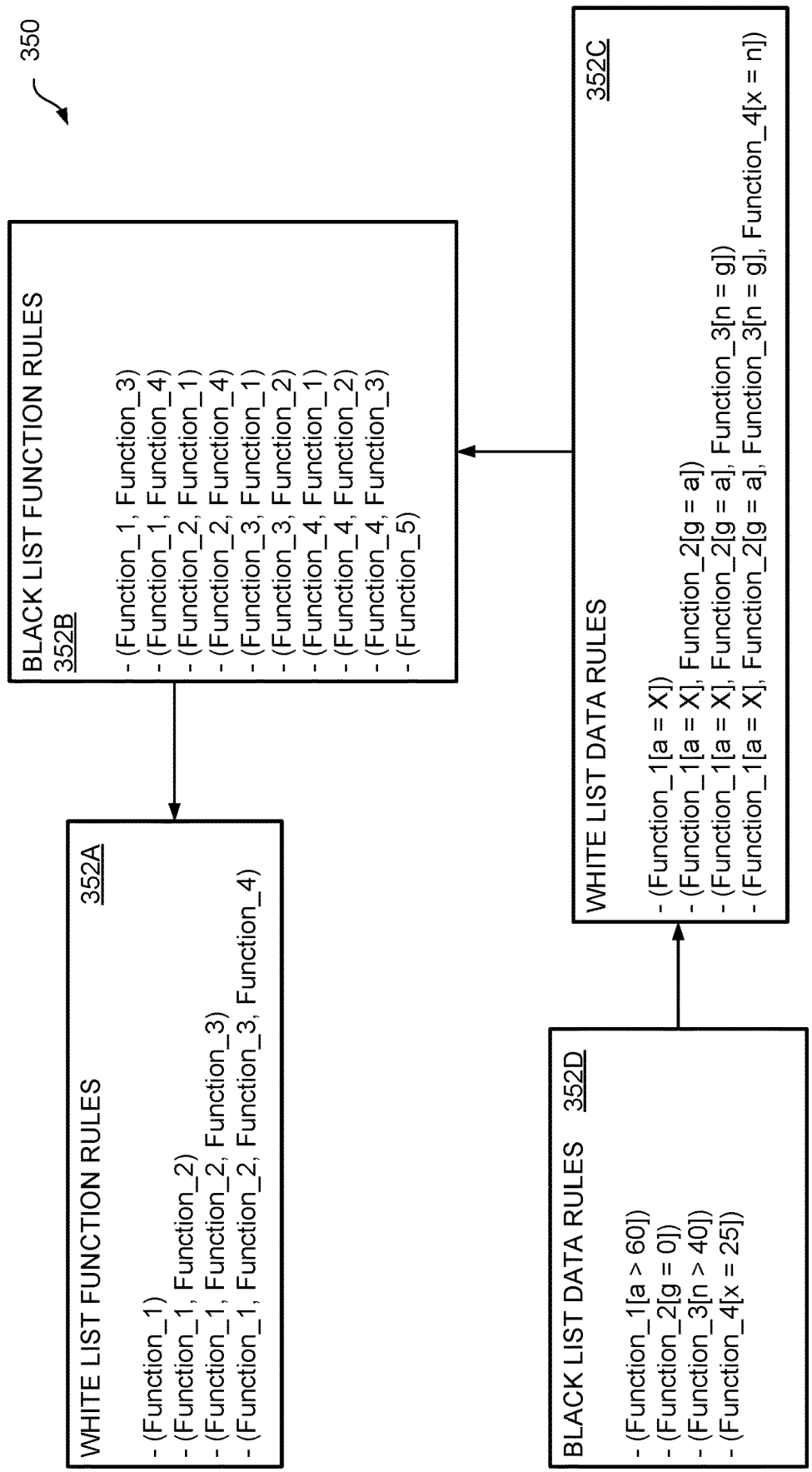
FIG. 3B is a data architecture diagram showing illustrative examples of function or data based access control rules in accordance with the disclosed technology.

FIG. 3B is a data architecture diagram showing illustrative examples of access control rule blocks 352 in access control policy blockchain 350 of FIG. 3A. Access control rules can take many forms in the disclosed technology.

For example, access control rule block 352A contains a white list of function based rules defining functions and function call chains that are permitted with respect to the function calls from transaction data block 242 of FIG. 3A. Function calls or function call chains in call stack 344 that do not conform to the white list function rules of rule block 352A will result in FBAC module 348 denying execution or completion of a function call.

For example, a call from Function_2 to Function_4 in call stack 344 does not match any of the white list rules and will result in FBAC module 348 generating a DENY signal to VM 342B, where the function call chain is executing. However, a call stack of Function_1 to Function_2 to Function_3 does match one of the white list rules and will result in FBAC module 348 generating an ALLOW signal to VM 342B. Note that the rules in block 352A are structured to permit each interim function call to occur for a permitted function call chain of Function_1 to Function_2 to Function_3 to Function_4.

Another form for the access control rules is illustrated in a black list of function based rules defining functions and function call chains that are prohibited with respect to the function calls from transaction data block 242 of FIG. 3A. Function calls or function call chains in call stack 344 that match one of the black list function rules of rule block 352A will result in FBAC module 348 denying execution or completion of a function call.

For example, a call to Function_5, e.g. a call to Deposit( ), is prohibited and will result in FBAC module 348 generating a DENY signal to VM 342B. Similarly, an out of permitted sequence call from Function_2 to Function_4 in call stack 344 matches one of the black list rules and will result in FBAC module 348 generating a DENY signal to VM 342B, where the function call chain is executing. However, a call from Function_1 to Function_2 does not match any of the black list rules and will result in FBAC module 348 generating an ALLOW signal to VM 342B.

Yet another form for the access control rules is illustrated in a white list of rules that are function and data based that define function calls and parameters that are permitted with respect to the function calls from transaction data block 242 of FIG. 3A. Function calls or function call chains and parameters in call stack 344 that do not conform to the white list function rules of rule block 352C will result in FBAC module 348 denying execution or completion of a function call.

For example, a call from Function_1 must have parameter a=X. A function call chain from Function_1 with parameter a=X to Function_2 with parameter g=a to Function_3 with parameter n=g in call stack 344 matches the (Function_1 [a=X], Function_2[g=a], Function_3[n=g]) white list rule and will result in FBAC module 348 generating an ALLOW signal to VM 342B, where the function call chain is executing. However, a call stack of Function_1 to Function_2 to Function_3 with parameters that do not match the functions and parameters in any of the white list rules and will result in FBAC module 348 generating a DENY signal to VM 342B. Note that the rules in block 352A are structured to permit each interim function call to occur for a permitted function call chain of Function_1 to Function_2 to Function_3 to Function_4.

Note that the example white list rules shown in access rule block 352C enforce a function call parameter relationship where a call parameter in each function call matches a parameter in a previous function call, e.g. (Function_1 [a=X], Function_2[g=a], Function_3[n=g], Function_4 [x=n]). For example, such a rule can be used to enforce that a consistent transaction identifier value be utilized throughout a function call chain, which may prevent a hack where a malicious actor attempts to redirect a transaction being executed in a smart contract.

Access rule block 352D illustrates an example of a black list of rules that are function and data based that define function calls and parameters that are prohibited with respect to the function calls from transaction data block 242 of FIG. 3A. Function calls or function call chains and parameters in call stack 344 that match one of the black list function and data based rules of rule block 352D will result in FBAC module 348 denying execution or completion of a function call.

For example, a call from Function_1 must not have a value for parameter a that is greater than 60. A function call from Function_2 must not have a parameter value g that equals 0. A function call from Function_3 must not have a value of parameter n that is greater than 40. A function call from Function_4 must not have a value of parameter x equal to 25. The rules in the example of rule block 352D illustrate access control policy that enforces limits on input parameters to functions in a smart contract.

Generally speaking, if the black lists and white lists are empty, then all function calls are allowed. If the black lists are empty and the white lists contain access control rules, then only the functions or function chains defined in the white list rules are permitted. If the black lists contain access control rules, but the white lists are empty, then all functions are prohibited. If both the black list and the white list contain access control rules, then the functions and function chains defined in the black list are prohibited, the functions and function chains defined in the white list are allowed. If access control rules in the black list and the white list are in conflict, then the black list rule generally takes precedence.

Note that the function or data based access rules can be stored in a side chain of a blockchain. Also note that the example access control rules illustrated in FIG. 3B are relatively simple and it will be readily appreciated that the disclosed technology enables highly complex and varied access control policy to be implemented at a system level. For example, multiple different function call chains or multiple call parameter values can be permitted or prohibited.

Also, the ACCESS or DENY signal generated by FBAC module 348 can be configured to be more complex or more complex access control policies defined. For example, instead of a simple DENY signal, FBAC module 348 can be configured to delay generation of an ALLOW signal for purposes of rate limitation. Similarly, instead of a simple ALLOW signal, FBAC module 348 can be configured to vary a time for generation of an ALLOW signal for purposes of differentiated QoS or resource allocation.

Likewise, in some implementations, state data can be maintained by FBAC module 348 and access control policies defined using state data. For example, state data regarding the number of times a function has been called within a time interval to generate a DENY signal for purposes of a circuit breaker function or to delay generation of an ALLOW signal for purposes of a rate limitation function.

Further, some access control policy can be defined to enforce permissions. For example, certain users or entities can be permitted access to particular data in a transaction data block using a white list rule or prohibited from accessing the data by a black list rule.

It will be readily appreciated that the disclosed technology enables complex and sophisticated access control policy to be defined and enforced at a system level. Many variations can be implemented that differ from the examples illustrated or go beyond the examples illustrated.

The access control policies illustrated in FIG. 3B can be defined and determine in a variety of ways. For example, a user with administrative permissions can define the access control rules and save them in the FBAC module 348 or as an addendum to a VM in kernel 340. In another example, a trusted entity, such as a Certificate Authority, receives the access control rules and manages distribution of the rules to the FBAC module 348 or VMs in an execution platform for smart contracts, such as blockchain platform 330.

In still another example, the user with administrative permissions can store the access control rules in rule blocks owned by the user on access control policy blockchain 350. Or, in a different example, the administrative user provides the access control rules to a trusted entity, such as a Certificate Authority, which stores the access control rules in rule blocks on access control policy blockchain 350 that are owned by the trusted entity.

FIG. 4A is a control flow diagram showing an illustrative example of a process 400 whereby access control policy is defined and distributed for use in function based access control in accordance with aspects of the disclosed technology. At 402, access control rules for an access control policy are defined as described above or in other ways as are suitable for a particular implementation. At 404, the access control rules are distributed as described above such that the access control rules are secure and accessible to FBAC module 348 or another module that performs the system level function based access control according to the disclosed technology.

FIG. 4B is a control flow diagram showing an illustrative example of a process 410 for system level function based access control in accordance with aspects of the disclosed technology. At 412, a smart contract is executed in a kernel execution framework, such as a kernel framework for smart contract execution provided by a blockchain platform, that is configured with function boundary detection instrumentation, e.g. eBPF. At 414, the function boundary detection instrumentation detects at function call at a system level, e.g. at the entrance or exit of a function call made when methods in the smart contract are executed.

At 416, a function call stack is created for the detected function calls. The function call stack can include chain of function calls that have been called in the sequence that they are called and can also include parameters passed in the function calls. In some implementations, other data, such as state data regarding the functions and resources, can also be maintained.

At 418, the function call stack is checked against the function or data based access control rules that have been defined. As described above, the access control rules can include white lists or black lists for function calls or data indicated in the function call stack. In addition, in some implementations, access control rules can be defined that utilize state data for certain purposes, such as a rate limitation or circuit breaker functionality.

At 420, if the access control rules indicate that the function call is allowed, then control branches to 422 to allow execution of the function. If the access control rules indicate that the function call is not allowed, then control branches to 424 to deny or block execution or completion of the function call.

Process 410 is a simplified process for function based access control. As discussed above, the access control rules and function based access control process can be configured to control function calls on a more sophisticated level, such as delaying or accelerating execution of a function call for QoS, dynamic resource allocation or rate limitation purposes.

Figure 4C:
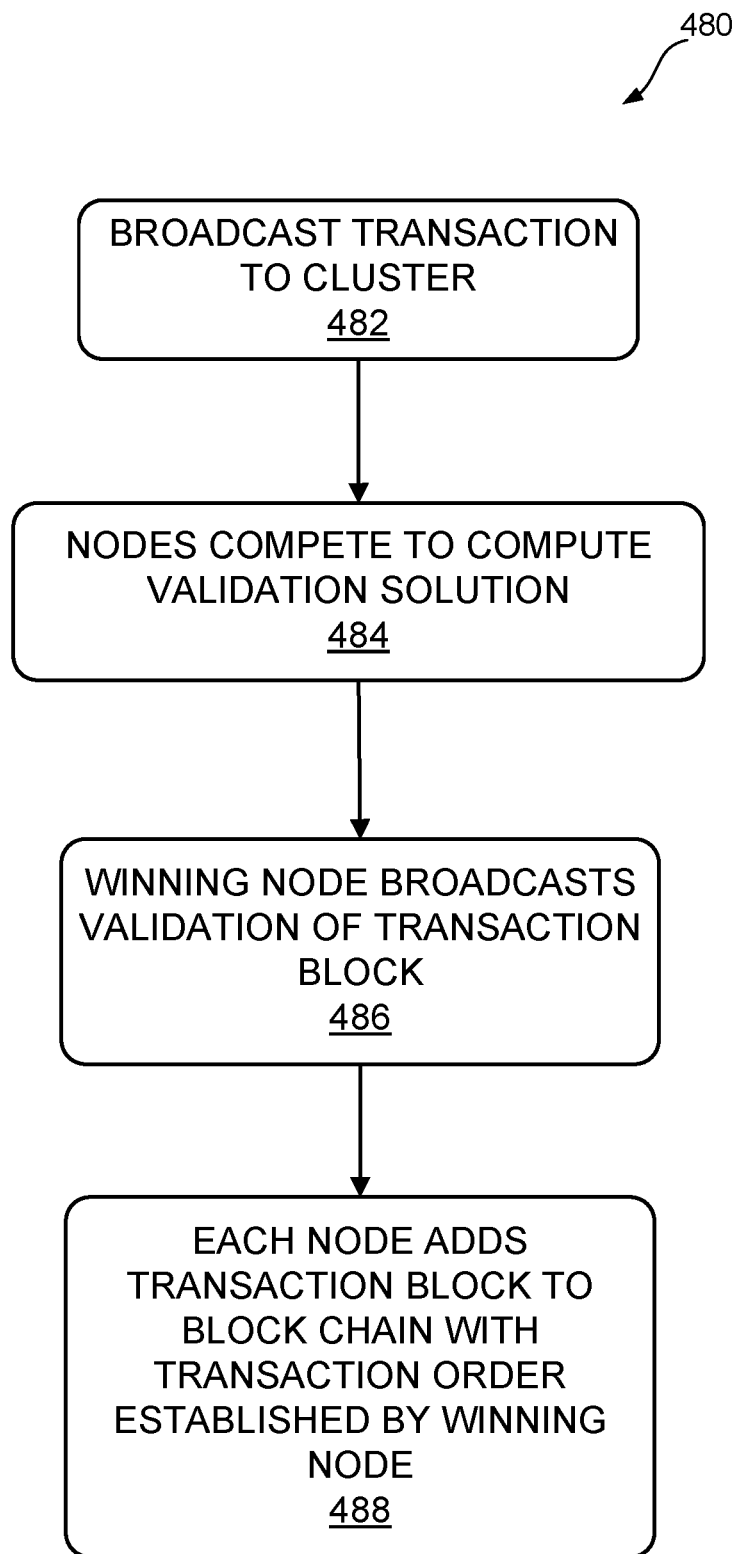
FIG. 4C is a control flow diagram illustrating an example of a validation process for blocks added to the transaction data blockchain or access control policy blockchain distributed to untrusted nodes.

FIG. 4C is a control flow diagram illustrating an example of a validation process 480 for blocks added to the transaction data blockchain ledger or access control policy blockchain ledger implemented using untrusted blockchain nodes. In process 480, when a transaction data block 142 is created for transaction data blockchain 140 or an access control rule block 152 is created for access control policy blockchain 150 in FIG. 1, the transaction is broadcast, at 482, to the cluster of untrusted nodes. At 484, nodes compete to compute a validation solution for the transaction. At 486, a winning node broadcasts the validation solution for the transaction data block or access control rule block and adds the data block to its copy of the corresponding data blockchain ledger, e.g. transaction data blockchain 140 or access control policy blockchain 150 in FIG. 1.

At 488, in response to the winning node's broadcast, the other nodes add the transaction data block or access control rule block to their copies of the transaction data blockchain ledger or access control policy blockchain ledger in the transaction order established by the winning node. The decentralized validation protocol can maintain the integrity, immutability and security of the transaction data blockchain ledger or access control policy blockchain ledger.

It should be appreciated that the processes shown for examples and a variety of other approaches may be utilized without departing from the disclosed technology.

Depending upon the scripting capabilities of the blockchain platform, the methods or function in the data blocks of the transaction data blockchain may include more extensive code execution. For example, a transaction data system that provides for shared access to the transaction by multiple users may involve more extensive code execution capability in the blockchain than a transaction data system that limits access to a single user. Such a transaction data system may involve access control policy utilizing system level function and data based access control to implement a system of permissions for controlling access to different parts of the transaction data.

It should be appreciated that the utilization of system level function based access control with access control rules based on functions or data can provide a high degree of flexibility, complexity and variation in the configuration of implementations without departing from the teaching of the disclosed technology.

Note that the disclosed technology is not limited to the transaction data example described above, but may be applied to a variety of smart contracts executing on blockchain platforms. The technology may be applied to provide secure system level access control in a wide variety of use contexts.

Figure 5:
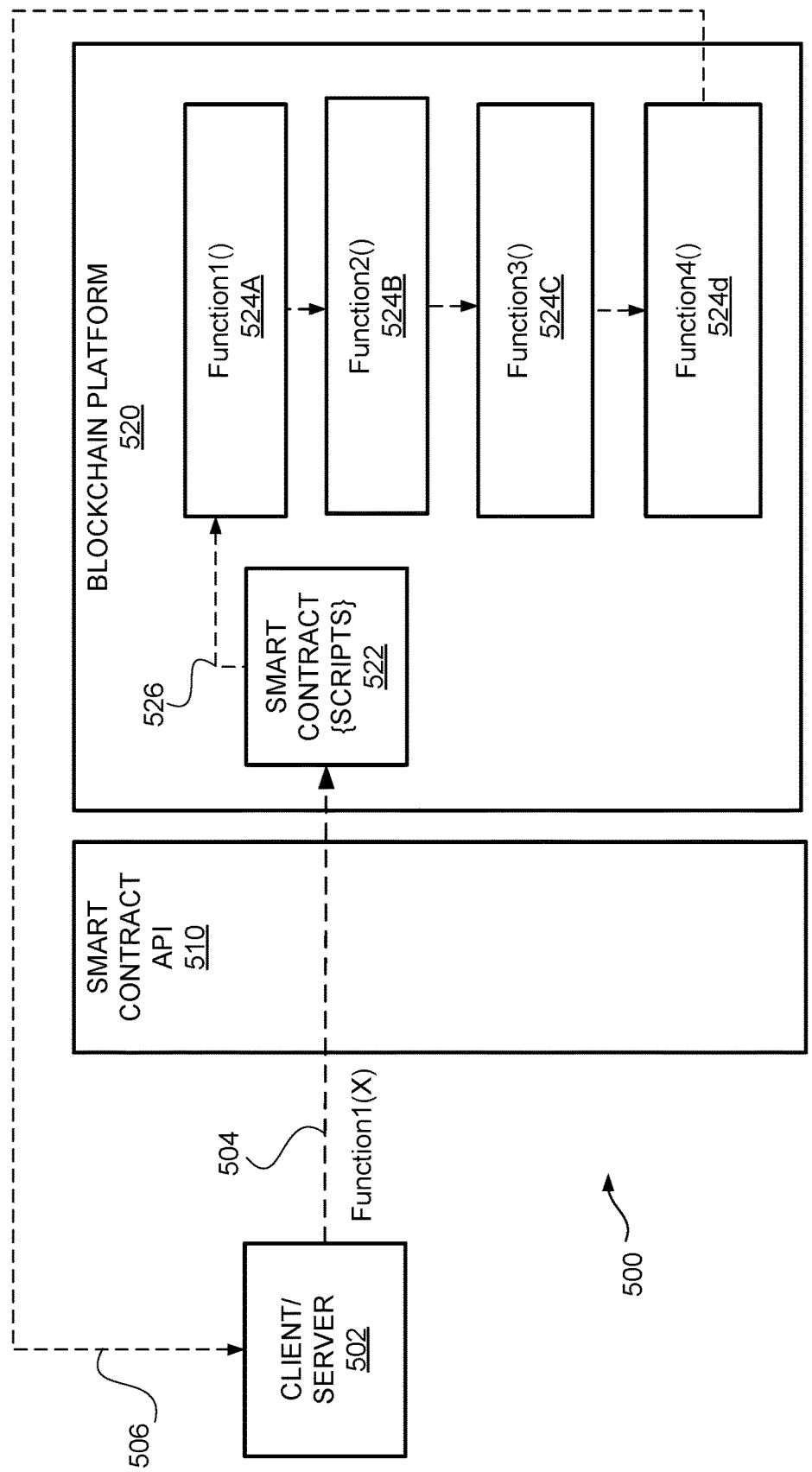
FIG. 5 is a data architecture diagram showing an illustrative example of a user using an application programming interface to invoke methods in a data block on the transaction data blockchain.

FIG. 5 is a data architecture diagram showing an illustrative example of an interface for initiating execution of smart contract scripts on a blockchain platform, such as the transaction data blocks in FIGS. 1, 2A, 2B and 3A. In this example, an Application Program Interface (API) 510 provides an interface to the blockchain platform 520 that supports the transaction data blockchain. The blockchain platform 520 supports a smart contract 522, such as transaction data block 242 in FIG. 2B, which includes scripts 524 with code that, when executed by the blockchain platform 520, performs operations with respect to the transaction data blockchain.

In the example of FIG. 5, four scripts are shown in smart contract 522. A client/server 502 initiates a transaction on the transaction data blockchain that causes Function_1 to execute and call Function_2. Function_2 calls Function_3, Function_3 calls Function_4, which, in this example, returns a message 506 to client/server 502. The functions are executed in an execution framework on blockchain platform 520, such as the framework shown in FIG. 3A, which uses access control rules to perform system level function based access control on the function calls.

Blockchain Ledger Data Structure

Figure 6A:
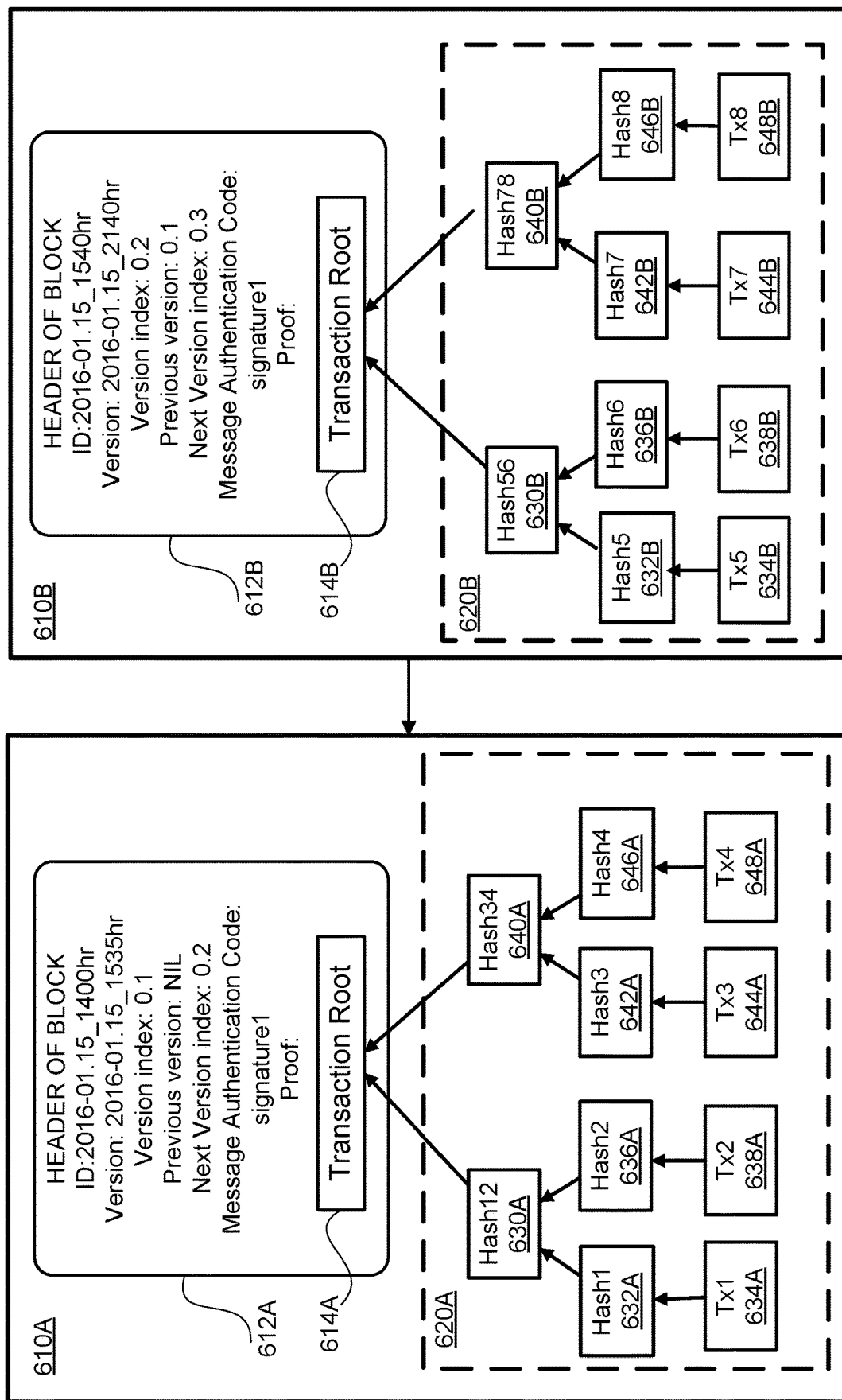
FIG. 6A is a data architecture diagram illustrating a simplified example of a blockchain ledger based on the transaction data blocks of the transaction data blockchain or access control rule blocks of the access control policy blockchain of FIG. 1.

FIG. 6A is a data architecture diagram illustrating a simplified example of a blockchain ledger 600 based on the blocks 142A-E of the transaction data blockchain 140 or blocks 152A-E of the access control policy blockchain 150 of FIG. 1. The blockchain ledger 600 example of FIG. 6A is simplified to show block headers, metadata and signatures of blocks 142A-E or blocks 152A-E in order to demonstrate a secure transaction data or access rule ledger using a blockchain. In outline, a blockchain ledger may be a globally shared transactional database.

FIG. 6A is an illustrative example of a blockchain ledger 600 with a data tree holding transaction data that is verified using cryptographic techniques. In FIG. 6A, each block 610 includes a block header 612 with information regarding previous and subsequent blocks and stores a transaction root node 614 to a data tree 620 holding transactional data. Transaction data may store smart contracts, data related to transactions, or any other data. The elements of smart contracts may also be stored within transaction nodes of the blocks.

In the example of FIG. 6A, a Merkle tree 620 is used to cryptographically secure the transaction data. For example, Transaction Tx1 node 634A of data tree 620A of block 610A can be hashed to Hash1 node 632A, Transaction Tx2 node 638A may be hashed to Hash2 node 636A. Hash1 node 632A and Hash2 node 636A may be hashed to Hash12 node 630A. A similar subtree may be formed to generate Hash34 node 640A. Hash12 node 630A and Hash34 node 640A may be hashed to Transaction Root 614A hash sorted in the data block 610A. By using a Merkle tree, or any similar data structure, the integrity of the transactions may be checked by verifying the hash is correct.

Figure 6B:
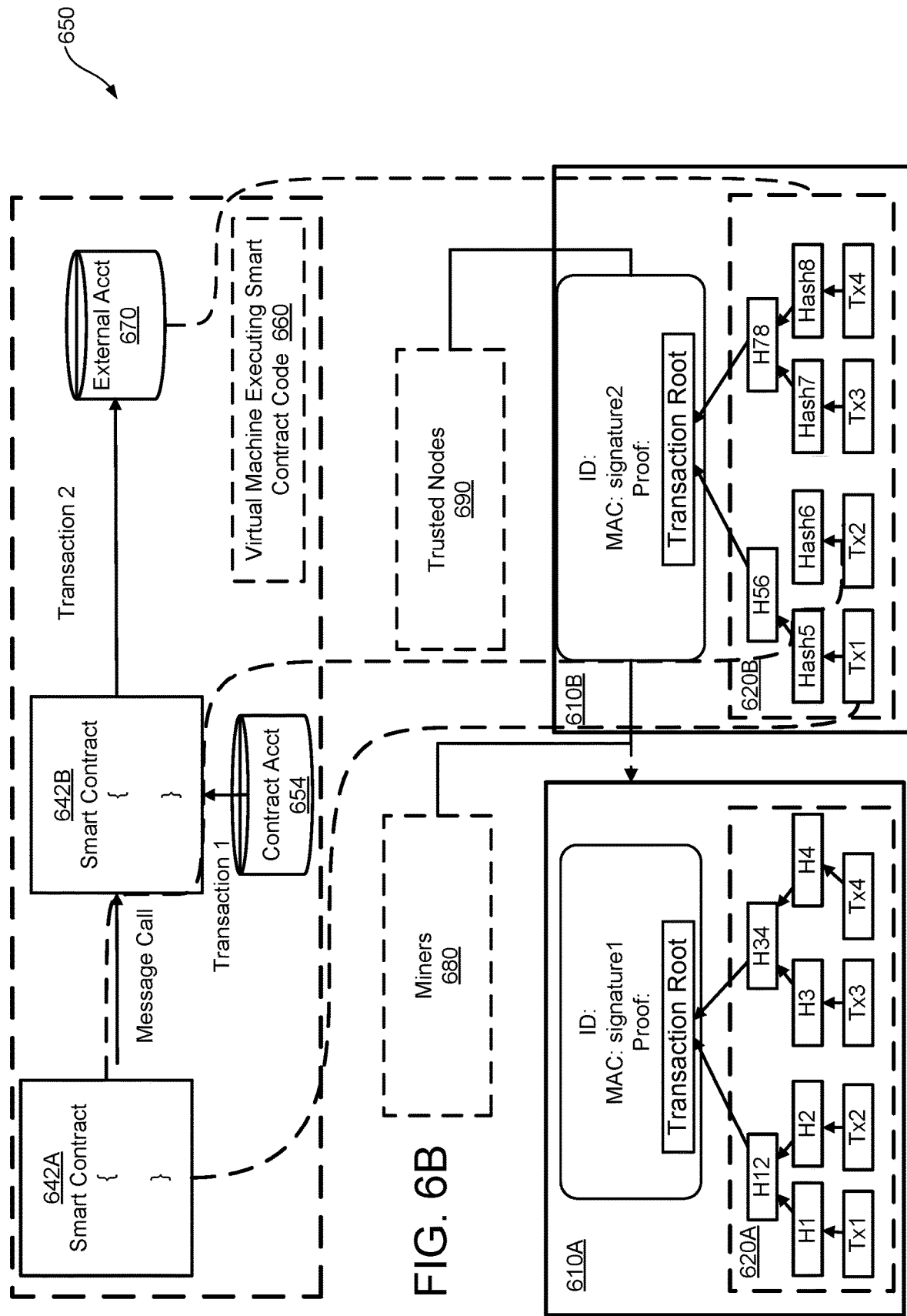
FIG. 6B is a data architecture diagram showing an illustrative example of smart contract code, transactions and messages that are bundled into a block so that their integrity is cryptographically secure and so that they may be appended to a blockchain ledger.

FIG. 6B is a data architecture diagram showing an illustrative example of smart contract code, transactions and messages that are bundled into a block so that their integrity is cryptographically secure and so that they may be appended to a blockchain ledger. In FIG. 6B, smart contracts 642 are code that executes on a computer. More specifically, the code of a smart contract may be stored in a blockchain ledger and executed by nodes of a distributed blockchain platform at a given time. The result of the smart code execution may be stored in a blockchain ledger. Optionally, a currency may be expended as smart contract code is executed. In the example of FIG. 6B, smart contracts 642 are executed in a virtual machine environment, although this is optional.

In FIG. 6B, the aspects of smart contracts 642 are stored in transaction data nodes in data tree 620 in the blocks 610 of the blockchain ledger of FIG. 6A. In the example of FIG. 6B, Smart Contract 642A is stored in data block Tx1 node 634A of data tree 620A in block 610A, Smart Contract 642B is stored in Tx2 node 638A, Contract Account 654 associated with Smart Contract 642B is stored in Tx3 node 644A, and External Account is stored in Tx4 node 648A.

Storage of Smart Contracts and Transaction Data in the Blockchain Ledger

To ensure the smart contracts are secure and generate secure data, the blockchain ledger must be kept up to date. For example, if a smart contract is created, the code associated with a smart contract must be stored in a secure way. Similarly, when smart contract code executes and generates transaction data, the transaction data must be stored in a secure way.

In the example of FIG. 6B, two possible embodiments for maintenance of the blockchain ledger are shown. In one embodiment, untrusted miner nodes ("miners") 680 may be rewarded for solving a cryptographic puzzle and thereby be allowed to append a block to the blockchain. Alternatively, a set of trusted nodes 690 may be used to append the next block to the blockchain ledger. Nodes may execute smart contract code, and then one winning node may append the next block to a blockchain ledger.

Though aspects of the technology disclosed herein resemble a smart contract, in the present techniques, the policy of the contract may determine the way that the blockchain ledger is maintained. For example, the policy may require that the validation or authorization process for blocks on the ledger is determined by a centralized control of a cluster of trusted nodes. In this case, the centralized control may be a trusted node, such as Certificate Authority 110, authorized to attest and sign the transaction blocks to validate them and validation by miners may not be needed.

Alternatively, the policy may provide for validation process decided by a decentralized cluster of untrusted nodes. In the situation where the blockchain ledger is distributed to a cluster of untrusted nodes, mining of blocks in the chain may be employed to validate the blockchain ledger.

Blockchains may use various time-stamping schemes, such as proof-of-work, to serialize changes. Alternate consensus methods include proof-of-stake, proof-of-burn, proof-of-research may also be utilized to serialize changes.

As noted above, in some examples, a blockchain ledger may be validated by miners to secure the blockchain. In this case, miners may collectively agree on a validation solution to be utilized. However, if a small network is utilized, e.g. private network, then the solution may be a Merkle tree and mining for the validation solution may not be required. When a transaction block is created, e.g. a transaction data block 142 for transaction data blockchain 140 or an access control rule block 152 for access control policy blockchain 150, the block is an unconfirmed and unidentified entity. To be part of the acknowledged "currency", it may be added to the blockchain, and therefore relates to the concept of a trusted cluster.

In a trusted cluster, when a data block 142 or 152 is added, every node competes to acknowledge the next "transaction" (e.g. a new transaction data or access control rule block). In one example, the nodes compete to mine and get the lowest hash value: min {previous_hash, contents_hash, random_nonce_to_be_guessed}→result. Transaction order is protected by the computational race (faith that no one entity can beat the collective resources of the blockchain network). Mutual authentication parameters are broadcast and acknowledged to prevent double entries in the blockchain.

Alternatively, by broadcasting the meta-data for authenticating a secure ledger across a restricted network, e.g. only the signed hash is broadcast, the blockchain may reduce the risks that come with data being held centrally. Decentralized consensus makes blockchains suitable for the recording of secure transactions or events. The meta-data, which may contain information related to the data file, may also be ciphered for restricted access so that the meta-data does not disclose information pertaining to the data file.

The mining process, such as may be used in concert with the validation process 480 of FIG. 4C, may be utilized to deter double accounting, overriding or replaying attacks, with the community arrangement on the agreement based on the "good faith" that no single node can control the entire cluster. A working assumption for mining is the existence of equivalent power distribution of honest parties with supremacy over dishonest or compromised ones. Every node or miner in a decentralized system has a copy of the blockchain. No centralized "official" copy exists and no user is "trusted" more than any other. Transactions are broadcast, at 482, to the network using software. Mining nodes compete, at 484, to compute a validation solution to validate transactions, and then broadcast, at 486, the completed block validation to other nodes. Each node adds the block, at 488, to its copy of the blockchain with transaction order established by the winning node.

Note that in a restricted network, stake-holders who are authorized to check or mine for the data file may or may not access the transaction blocks themselves, but would need to have keys to the meta-data (since they are members of the restricted network, and are trusted) to get the details. As keys are applied on data with different data classifications, the stake-holders can be segmented.

A decentralized blockchain may also use ad-hoc secure message passing and distributed networking. In this example, the access control policy blockchain ledger may be different from a conventional blockchain in that there is a centralized clearing house, e.g. authorized central control for validation. Without the mining process, the trusted cluster can be contained in a centralized blockchain instead of a public or democratic blockchain. One way to view this is that a decentralized portion is as "democratic N honest parties" (multiparty honest party is a cryptography concept), and a centralized portion as a "trusted monarchy for blockchain information correction". For example, there may be advantages to maintaining the data file as centrally authorized and kept offline.

In some examples, access to a resource and access control rule on a blockchain can be restricted by cryptographic means to be only open to authorized servers. Since the transaction data or access control policy blockchain ledgers are distributed, the authorized servers can validate it. A public key may be used as an address on a public blockchain ledger.

Note that growth of a decentralized blockchain may be accompanied by the risk of node centralization because the computer resources required to operate on bigger data become increasingly expensive.

The present techniques may involve operations occurring in one or more machines. As used herein, "machine" means physical data-storage and processing hardware programmed with instructions to perform specialized computing operations. It is to be understood that two or more different machines may share hardware components. For example, the same integrated circuit may be part of two or more different machines.

One of ordinary skill in the art will recognize that a wide variety of approaches may be utilized and combined with the present approach involving a access control policy blockchain ledger. The specific examples of different aspects of a access control policy blockchain ledger described herein are illustrative and are not intended to limit the scope of the techniques shown.

Smart Contracts

Smart contracts are defined by code. As described previously, the terms and conditions of the smart contract may be encoded (e.g., by hash) into a blockchain ledger. Specifically, smart contracts may be compiled into a bytecode (if executed in a virtual machine), and then the bytecode may be stored in a blockchain ledger as described previously. Similarly, transaction data executed and generated by smart contracts may be stored in the blockchain ledger in the ways previously described.

Computer Architectures for Use of Smart Contracts and Blockchain Ledgers

Figure 8:
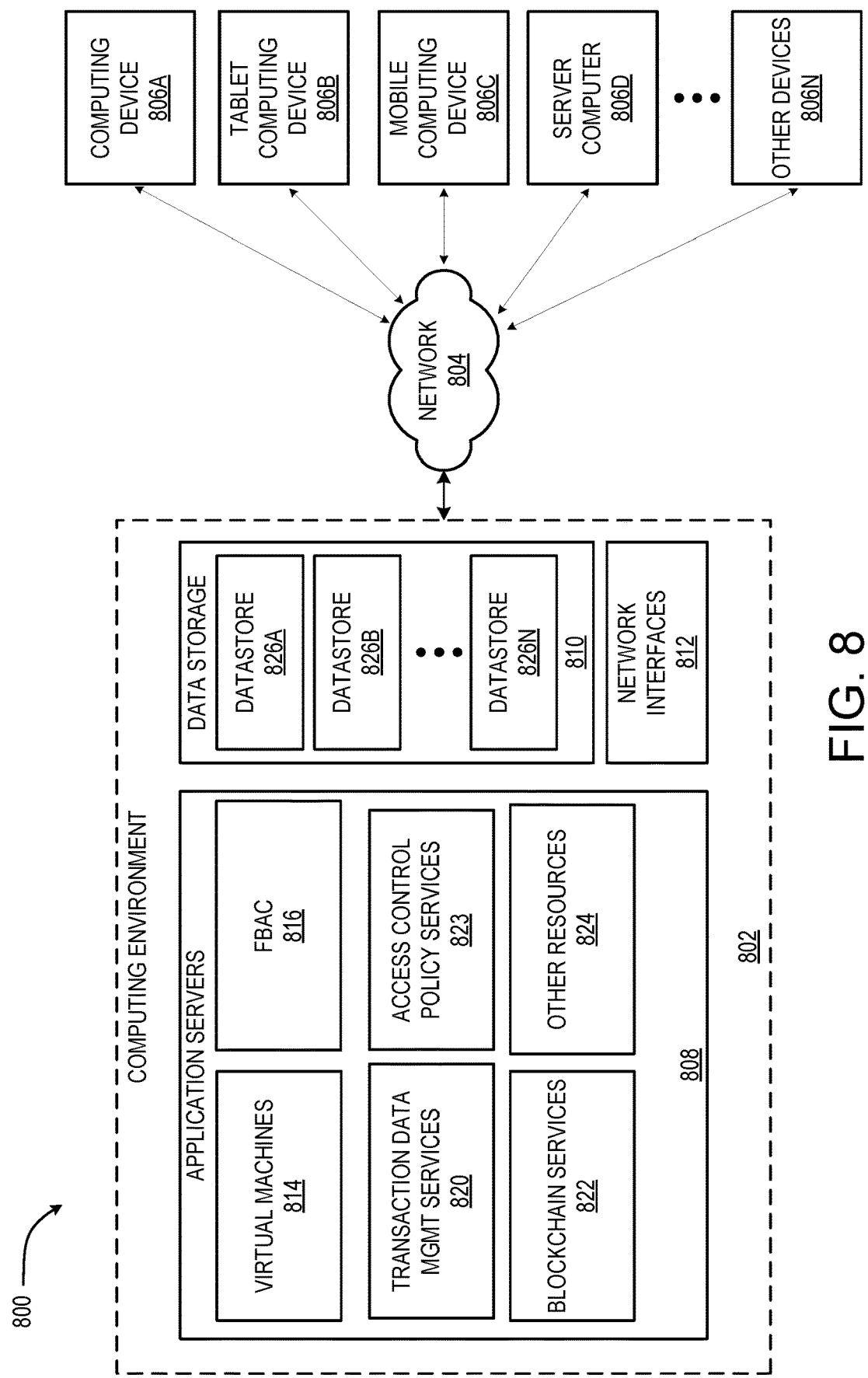
FIG. 8 is a diagram illustrating a distributed computing environment capable of implementing aspects of the techniques and technologies presented herein.

Note that at least parts of processes 400, 410, and 480 of FIGS. 4A-C, the scripts of transaction data block 242 of FIG. 2B, smart contract 522 of FIG. 5, smart contracts 642 of FIG. 6B, and other processes and operations pertaining to transaction data and access control policy blockchain ledgers described herein may be implemented in one or more servers, such as computer environment 800 in FIG. 8, or the cloud, and data defining the results of user control input signals translated or interpreted as discussed herein may be communicated to a user device for display. Alternatively, the access control policy blockchain ledger processes may be implemented in a client device. In still other examples, some operations may be implemented in one set of computing resources, such as servers, and other steps may be implemented in other computing resources, such as a client device.

It should be understood that the methods described herein can be ended at any time and need not be performed in their entireties. Some or all operations of the methods described herein, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

As described herein, in conjunction with the FIGURES described herein, the operations of the routines (e.g. processes 400, 410, and 480 of FIGS. 4A-C, the scripts of transaction data block 242 of FIG. 2B, smart contract 522 of FIG. 5, smart contracts 642 of FIG. 6B) are described herein as being implemented, at least in part, by an application, component, and/or circuit. Although the following illustration refers to the components of FIGS. 1, 2B, 4A-C, 5 and 6B, it can be appreciated that the operations of the routines may be also implemented in many other ways. For example, the routines may be implemented, at least in part, by a computer processor or a processor or processors of another computer. In addition, one or more of the operations of the routines may alternatively or additionally be implemented, at least in part, by a computer working alone or in conjunction with other software modules.

For example, the operations of routines are described herein as being implemented, at least in part, by an application, component and/or circuit, which are generically referred to herein as modules. In some configurations, the modules can be a dynamically linked library (DLL), a statically linked library, functionality produced by an application programming interface (API), a compiled program, an interpreted program, a script or any other executable set of instructions. Data and/or modules, such as the data and modules disclosed herein, can be stored in a data structure in one or more memory components. Data can be retrieved from the data structure by addressing links or references to the data structure.

Although the following illustration refers to the components of the FIGURES discussed above, it can be appreciated that the operations of the routines (e.g. processes 400, 410, and 480 of FIGS. 4A-C, the scripts of transaction data block 242 of FIG. 2B, smart contract 522 of FIG. 5, smart contracts 642 of FIG. 6B) may be also implemented in many other ways. For example, the routines may be implemented, at least in part, by a processor of another remote computer or a local computer or circuit. In addition, one or more of the operations of the routines may alternatively or additionally be implemented, at least in part, by a chipset working alone or in conjunction with other software modules. Any service, circuit or application suitable for providing the techniques disclosed herein can be used in operations described herein.

FIG. 7 shows additional details of an example computer architecture 700 for a computer, such as the devices 110 and 120A-C (FIG. 1), capable of executing the program components described herein. Thus, the computer architecture 700 illustrated in FIG. 7 illustrates an architecture for a server computer, mobile phone, a PDA, a smart phone, a desktop computer, a netbook computer, a tablet computer, an on-board computer, a game console, and/or a laptop computer. The computer architecture 700 may be utilized to execute any aspects of the software components presented herein.

The computer architecture 700 illustrated in FIG. 7 includes a central processing unit 702 ("CPU"), a system memory 704, including a random access memory 706 ("RAM") and a read-only memory ("ROM") 708, and a system bus 710 that couples the memory 704 to the CPU 702. A basic input/output system containing the basic routines that help to transfer information between sub-elements within the computer architecture 700, such as during startup, is stored in the ROM 708. The computer architecture 700 further includes a mass storage device 712 for storing an operating system 707, data (such as a copy of transaction data blockchain data 720 or access control policy blockchain data 722), and one or more application programs.

The mass storage device 712 is connected to the CPU 702 through a mass storage controller (not shown) connected to the bus 710. The mass storage device 712 and its associated computer-readable media provide non-volatile storage for the computer architecture 700. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 700.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 700. For purposes the claims, the phrase "computer storage medium," "computer-readable storage medium" and variations thereof, does not include waves, signals, and/or other transitory and/or intangible communication media, per se.

According to various configurations, the computer architecture 700 may operate in a networked environment using logical connections to remote computers through the network 756 and/or another network (not shown). The computer architecture 700 may connect to the network 756 through a network interface unit 714 connected to the bus 710. It should be appreciated that the network interface unit 714 also may be utilized to connect to other types of networks and remote computer systems. The computer architecture 700 also may include an input/output controller 716 for receiving and processing input from a number of other devices, including a keyboard, mouse, game controller, television remote or electronic stylus (not shown in FIG.

7). Similarly, the input/output controller 716 may provide output to a display screen, a printer, or other type of output device (also not shown in FIG. 7).

It should be appreciated that the software components described herein may, when loaded into the CPU 702 and executed, transform the CPU 702 and the overall computer architecture 700 from a general-purpose computing system into a special-purpose computing system customized to facilitate the functionality presented herein. The CPU 702 may be constructed from any number of transistors or other discrete circuit elements, which may individually or collectively assume any number of states. More specifically, the CPU 702 may operate as a finite-state machine, in response to executable instructions contained within the software modules disclosed herein. These computer-executable instructions may transform the CPU 702 by specifying how the CPU 702 transitions between states, thereby transforming the transistors or other discrete hardware elements constituting the CPU 702.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 700 in order to store and execute the software components presented herein. It also should be appreciated that the computer architecture 700 may include other types of computing devices, including hand-held computers, embedded computer systems, personal digital assistants, and other types of computing devices known to those skilled in the art. It is also contemplated that the computer architecture 700 may not include all of the components shown in FIG. 7, may include other components that are not explicitly shown in FIG. 7, or may utilize an architecture completely different than that shown in FIG. 7.

FIG. 8 depicts an illustrative distributed computing environment 800 capable of executing the software components described herein for system level function based access control for a blockchain ledger. Thus, the distributed computing environment 800 illustrated in FIG. 8 can be utilized to execute many aspects of the software components presented herein. For example, the distributed computing environment 800 can be utilized to execute one or more aspects of the software components described herein. Also, the distributed computing environment 800 may represent components of the distributed blockchain platform discussed above.

According to various implementations, the distributed computing environment 800 includes a computing environment 802 operating on, in communication with, or as part of the network 804. The network 804 may be or may include the network 856, described above. The network 804 also can include various access networks. One or more client devices 806A-806N (hereinafter referred to collectively and/or generically as "clients 806") can communicate with the computing environment 802 via the network 804 and/or other connections (not illustrated in FIG. 8). In one illustrated configuration, the clients 806 include a computing device 806A, such as a laptop computer, a desktop computer, or other computing device; a slate or tablet computing device ("tablet computing device") 806B; a mobile computing device 806C such as a mobile telephone, a smart phone, an on-board computer, or other mobile computing device; a server computer 806D; and/or other devices 806N, which can include a hardware security module. It should be understood that any number of devices 806 can communicate with the computing environment 802. Two example computing architectures for the devices 806 are illustrated and described herein with reference to FIGS. 7 and 8. It should be understood that the illustrated devices 806 and computing architectures illustrated and described herein are illustrative only and should not be construed as being limited in any way.

In the illustrated configuration, the computing environment 802 includes application servers 808, data storage 810, and one or more network interfaces 812. According to various implementations, the functionality of the application servers 808 can be provided by one or more server computers that are executing as part of, or in communication with, the network 804. The application servers 808 can host various services, virtual machines, portals, and/or other resources. In the illustrated configuration, the application servers 808 host one or more virtual machines 814 for hosting applications or other functionality. According to various implementations, the virtual machines 814 host one or more applications and/or software modules for a data management blockchain ledger. It should be understood that this configuration is illustrative only and should not be construed as being limiting in any way.

The application servers 808 can also host system level function based access control functionality module 816, such as those described with respect to blockchain platform 330 of FIG. 3A. FBAC module 816 can apply access control policy to smart contracts executing in virtual machines 814.

According to various implementations, the application servers 808 also include one or more transaction data management services 820 and one or more blockchain services 822. The transaction data management services 820 can include services for managing transaction data on a transaction data blockchain, such as transaction data blockchain 140 in FIG. 1. The access control policy management services 823 can include services for managing access control rules on an access control policy blockchain, such as access control policy blockchain 150 in FIG. 1 or otherwise maintain access control policy that is applied by FBAC module 816. The blockchain services 822 can include services for participating in management of one or more blockchains, such as by creating genesis blocks, transaction data or access control rule blocks, and performing validation.

As shown in FIG. 8, the application servers 808 also can host other services, applications, portals, and/or other resources ("other resources") 824. The other resources 824 can include, but are not limited to, data encryption, data sharing, or any other functionality.

As mentioned above, the computing environment 802 can include data storage 810. According to various implementations, the functionality of the data storage 810 is provided by one or more databases or data stores operating on, or in communication with, the network 804. The functionality of the data storage 810 also can be provided by one or more server computers configured to host data for the computing environment 802. The data storage 810 can include, host, or provide one or more real or virtual data stores 826A-826N (hereinafter referred to collectively and/or generically as "datastores 826"). The datastores 826 are configured to host data used or created by the application servers 808 and/or other data. Aspects of the datastores 826 may be associated with services for a access control policy blockchain. Although not illustrated in FIG. 8, the datastores 826 also can host or store web page documents, word documents, presentation documents, data structures, algorithms for execution by a recommendation engine, and/or other data utilized by any application program or another module.

The computing environment 802 can communicate with, or be accessed by, the network interfaces 812. The network interfaces 812 can include various types of network hardware and software for supporting communications between two or more computing devices including, but not limited to, the clients 806 and the application servers 808. It should be appreciated that the network interfaces 812 also may be utilized to connect to other types of networks and/or computer systems.

It should be understood that the distributed computing environment 800 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 800 may provide the software functionality described herein as a service to the clients using devices 806. It should be understood that the devices 806 can include real or virtual machines including, but not limited to, server computers, web servers, personal computers, mobile computing devices, smart phones, and/or other devices, which can include user input devices. As such, various configurations of the concepts and technologies disclosed herein enable any device configured to access the distributed computing environment 800 to utilize the functionality described herein for creating and supporting a access control policy blockchain ledger, among other aspects.

Turning now to FIG. 9, an illustrative computing device architecture 900 for a computing device that is capable of executing various software components is described herein for supporting a blockchain ledger and applying access control policy to the blockchain ledger. The computing device architecture 900 is applicable to computing devices that can manage a blockchain ledger. In some configurations, the computing devices include, but are not limited to, mobile telephones, on-board computers, tablet devices, slate devices, portable video game devices, traditional desktop computers, portable computers (e.g., laptops, notebooks, ultra-portables, and netbooks), server computers, game consoles, and other computer systems. The computing device architecture 900 is applicable to the Certificate Authority 110, client/servers 120A-C and blockchain platform 130 shown in FIG. 1 and computing device 806A-N shown in FIG. 8.

The computing device architecture 900 illustrated in FIG. 9 includes a processor 902, memory components 904, network connectivity components 906, sensor components 908, input/output components 910, and power components 912. In the illustrated configuration, the processor 902 is in communication with the memory components 904, the network connectivity components 906, the sensor components 908, the input/output ("I/O") components 910, and the power components 912. Although no connections are shown between the individual components illustrated in FIG. 9, the components can interact to carry out device functions. In some configurations, the components are arranged so as to communicate via one or more busses (not shown).

The processor 902 includes a central processing unit ("CPU") configured to process data, execute computer-executable instructions of one or more application programs, and communicate with other components of the computing device architecture 900 in order to perform various functionality described herein. The processor 902 may be utilized to execute aspects of the software components presented herein and, particularly, those that utilize, at least in part, secure data.

In some configurations, the processor 902 includes a graphics processing unit ("GPU") configured to accelerate operations performed by the CPU, including, but not limited to, operations performed by executing secure computing applications, general-purpose scientific and/or engineering computing applications, as well as graphics-intensive computing applications such as high resolution video (e.g., 620P, 1080P, and higher resolution), video games, three-dimensional ("3D") modeling applications, and the like. In some configurations, the processor 902 is configured to communicate with a discrete GPU (not shown). In any case, the CPU and GPU may be configured in accordance with a co-processing CPU/GPU computing model, wherein a sequential part of an application executes on the CPU and a computationally-intensive part is accelerated by the GPU.

In some configurations, the processor 902 is, or is included in, a system-on-chip ("SoC") along with one or more of the other components described herein below. For example, the SoC may include the processor 902, a GPU, one or more of the network connectivity components 906, and one or more of the sensor components 908. In some configurations, the processor 902 is fabricated, in part, utilizing a package-on-package ("PoP") integrated circuit packaging technique. The processor 902 may be a single core or multi-core processor.

The processor 902 may be created in accordance with an ARM architecture, available for license from ARM HOLDINGS of Cambridge, United Kingdom. Alternatively, the processor 902 may be created in accordance with an x86 architecture, such as is available from INTEL CORPORATION of Mountain View, Calif. and others. In some configurations, the processor 902 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRU- MENTS of Dallas, Tex., a customized version of any of the above SoCs, or a proprietary SoC.

The memory components 904 include a random access memory ("RAM") 914, a read-only memory ("ROM") 916, an integrated storage memory ("integrated storage") 918, and a removable storage memory ("removable storage") 920. In some configurations, the RAM 914 or a portion thereof, the ROM 916 or a portion thereof, and/or some combination of the RAM 914 and the ROM 916 is integrated in the processor 902. In some configurations, the ROM 916 is configured to store a firmware, an operating system or a portion thereof (e.g., operating system kernel), and/or a bootloader to load an operating system kernel from the integrated storage 918 and/or the removable storage 920.

The integrated storage 918 can include a solid-state memory, a hard disk, or a combination of solid-state memory and a hard disk. The integrated storage 918 may be soldered or otherwise connected to a logic board upon which the processor 902 and other components described herein also may be connected. As such, the integrated storage 918 is integrated in the computing device. The integrated storage 918 is configured to store an operating system or portions thereof, application programs, data, and other software components described herein.

The removable storage 920 can include a solid-state memory, a hard disk, or a combination of solid-state memory and a hard disk. In some configurations, the removable storage 920 is provided in lieu of the integrated storage 918. In other configurations, the removable storage 920 is provided as additional optional storage. In some configurations, the removable storage 920 is logically combined with the integrated storage 918 such that the total available storage is made available as a total combined storage capacity. In some configurations, the total combined capacity of the integrated storage 918 and the removable storage 920 is shown to a user instead of separate storage capacities for the integrated storage 918 and the removable storage 920.

The removable storage 920 is configured to be inserted into a removable storage memory slot (not shown) or other mechanism by which the removable storage 920 is inserted and secured to facilitate a connection over which the removable storage 920 can communicate with other components of the computing device, such as the processor 902. The removable storage 920 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 904 can store an operating system. According to various configurations, the operating system may include, but is not limited to, server operating systems such as various forms of UNIX certified by The Open Group and LINUX certified by the Free Software Foundation, or aspects of Software-as-a-Service (SaaS) architectures, such as MICROSFT AZURE from Microsoft Corporation of Redmond, Wash. or AWS from Amazon Corporation of Seattle, Wash. The operating system may also include WINDOWS MOBILE OS from Microsoft Corporation of Redmond, Wash., WINDOWS PHONE OS from Microsoft Corporation, WINDOWS from Microsoft Corporation, MAC OS or IOS from Apple Inc. of Cupertino, Calif., and ANDROID OS from Google Inc. of Mountain View, Calif. Other operating systems are contemplated.

The network connectivity components 906 include a wireless wide area network component ("WWAN component") 922, a wireless local area network component ("WLAN component") 924, and a wireless personal area network component ("WPAN component") 926. The network connectivity components 906 facilitate communications to and from the network 956 or another network, which may be a WWAN, a WLAN, or a WPAN. Although only the network 956 is illustrated, the network connectivity components 906 may facilitate simultaneous communication with multiple networks, including the network 956 of FIG. 9. For example, the network connectivity components 906 may facilitate simultaneous communications with multiple networks via one or more of a WWAN, a WLAN, or a WPAN.

The network 956 may be or may include a WWAN, such as a mobile telecommunications network utilizing one or more mobile telecommunications technologies to provide voice and/or data services to a computing device utilizing the computing device architecture 900 via the WWAN component 922. The mobile telecommunications technologies can include, but are not limited to, Global System for Mobile communications ("GSM"), Code Division Multiple Access ("CDMA") ONE, CDMA7000, Universal Mobile Telecommunications System ("UMTS"), Long Term Evolution ("LTE"), and Worldwide Interoperability for Microwave Access ("WiMAX"). Moreover, the network 956 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 956 may be configured to provide voice and/or data communications with any combination of the above technologies. The network 956 may be configured to or be adapted to provide voice and/or data communications in accordance with future generation technologies.

In some configurations, the WWAN component 922 is configured to provide dual-multi-mode connectivity to the network 956. For example, the WWAN component 922 may be configured to provide connectivity to the network 956, wherein the network 956 provides service via GSM and UMTS technologies, or via some other combination of technologies. Alternatively, multiple WWAN components 922 may be utilized to perform such functionality, and/or provide additional functionality to support other non-compatible technologies (i.e., incapable of being supported by a single WWAN component). The WWAN component 922 may facilitate similar connectivity to multiple networks (e.g., a UMTS network and an LTE network).

The network 956 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 924 is configured to connect to the network 956 via the WI-FI access points. Such connections may be secured via various encryption technologies including, but not limited to, WI-FI Protected Access ("WPA"), WPA2, Wired Equivalent Privacy ("WEP"), and the like.

The network 956 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 926 is configured to facilitate communications with other devices, such as peripherals, computers, or other computing devices via the WPAN.

The sensor components 908 include a magnetometer 928, an ambient light sensor 930, a proximity sensor 932, an accelerometer 934, a gyroscope 936, and a Global Positioning System sensor ("GPS sensor") 938. It is contemplated that other sensors, such as, but not limited to, temperature sensors or shock detection sensors, also may be incorporated in the computing device architecture 900.

The I/O components 910 include a display 940, a touchscreen 942, a data I/O interface component ("data I/O") 944, an audio I/O interface component ("audio I/O") 946, a video I/O interface component ("video I/O") 948, and a camera 950. In some configurations, the display 940 and the touchscreen 942 are combined. In some configurations two or more of the data I/O component 944, the audio I/O component 946, and the video I/O component 948 are combined. The I/O components 910 may include discrete processors configured to support the various interfaces described below or may include processing functionality built-in to the processor 902.

The illustrated power components 912 include one or more batteries 952, which can be connected to a battery gauge 954. The batteries 952 may be rechargeable or disposable. Rechargeable battery types include, but are not limited to, lithium polymer, lithium ion, nickel cadmium, and nickel metal hydride. Each of the batteries 952 may be made of one or more cells.

The power components 912 may also include a power connector, which may be combined with one or more of the aforementioned I/O components 910. The power components 912 may interface with an external power system or charging equipment via an I/O component.

EXAMPLES OF VARIOUS IMPLEMENTATIONS

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The present disclosure is made in light of the following clauses:

Clause 1: A computer-implemented method for system level function based access control for smart contract execution on a blockchain, the method comprising, in a kernel execution framework for smart contract execution on a blockchain, where the kernel execution framework is configured to perform function boundary detection: detecting a function call by one or more methods of a smart contract on the blockchain; adding the function call to a function call stack for the smart contract; checking the function call stack against a set of function based access control rules that defines one or more permitted or prohibited sequences of function calls; and if the function call stack includes one or more function calls that are not permitted under the set of function based access control rules, then blocking execution or completion of the function call.

Clause 2. The computer-implemented method of Clause 1, where: the function call stack includes each function called during execution of the smart contract; the set of function based access control rules includes at least one access control rule that defines a sequence of function calls; and the step of checking the function call stack against the set of function based access control rules includes checking the function call stack against the sequence of function calls defined in the access control rule that defines a sequence of function calls.

Clause 3. The computer-implemented method of Clause 1, where: the step of defining a set of function based access control rules includes at least one data based access control rule; the step of detecting a function call by one or more methods of a smart contract on the blockchain includes detecting at least one value included in the function call stack; the step of checking the function call stack against a set of function based access control rules includes checking the at least one value included in the function call stack against the data based access control rule; and the step of, if the sequence of function calls is not permitted under the set of function based access control rules, then blocking the function call, includes: if the at least one value included in the sequence of function calls is not permitted under the set of data based access control rules, then blocking the function call.

Clause 4. The computer-implemented method of Clause 1, where: the set of function based access control rules is stored on a blockchain; and the method includes modifying the set of function based access control rules by adding a function based access control rule block to the blockchain.

Clause 5. The computer-implemented method of Clause 1, wherein the kernel execution framework comprises a Linux operating system framework and the function boundary detection comprises extended Berkeley Packet Filtering.

Clause 6. The computer-implemented method of Clause 1, where the steps of detecting a function call by one or more methods of a smart contract on the blockchain, adding the function call to a function call stack for the smart contract, checking the function call stack against the set of function based access control rules, and, if the function call is not permitted under the set of function based access control rules, then blocking the function call are performed within one or more virtual machines executing the framework for execution of the smart contract on the blockchain.

Clause 7. The computer-implemented method of Clause 1, where the set of function based access control rules includes at least one of a white list of allowed sequences of function calls and a black list of prohibited sequences of function calls.

Clause 8. A system for system level function based access control for smart contract execution on a blockchain, the system comprising: one or more processors; and one or more memory devices in communication with the one or more processors, the memory devices having computer-readable instructions stored thereupon that, when executed by the processors, cause the processors to perform a method for system level function based access control for smart contract execution on a blockchain, the method comprising, in a kernel execution framework for smart contract execution on a blockchain, where the kernel execution framework is configured to perform function boundary detection: detecting a function call by one or more methods of a smart contract on the blockchain; adding the function call to a function call stack for the smart contract; checking the function call stack against a set of function based access control rules that defines one or more permitted or prohibited sequences of function calls; and if the function call stack includes one or more function calls that are not permitted under the set of function based access control rules, then blocking execution or completion of the function call.

Clause 9. The system of Clause 8, where: the function call stack includes each function called during execution of the smart contract; the set of function based access control rules includes at least one access control rule that defines a sequence of function calls; and the step of checking the function call stack against the set of function based access control rules includes checking the function call stack against the sequence of function calls defined in the access control rule that defines a sequence of function calls.

Clause 10. The system of Clause 8, where: the step of defining a set of function based access control rules includes at least one data based access control rule; the step of detecting a function call between one or more methods of a smart contract on the blockchain includes detecting at least one value included in the function call stack; the step of checking the function call stack against the set of function based access control rules includes checking the at least one value included in the function call stack against the data based access control rule; and the step of, if the sequence of function calls is not permitted under the set of function based access control rules, then blocking the function call, includes: if the at least one value included in the sequence of function calls is not permitted under the set of data based access control rules, then blocking the function call.

Clause 11. The system of Clause 8, where: the set of function based access control rules is stored on a blockchain; and the method includes modifying the set of function based access control rules by adding a function based access control rule block to the blockchain.

Clause 12. The system of Clause 8, wherein the kernel execution framework comprises a Linux operating system framework and the function boundary detection comprises extended Berkeley Packet Filtering.

Clause 13. The system of Clause 8, where the steps of detecting a function call by one or more methods of a smart contract on the blockchain, adding the function call to a function call stack for the smart contract, checking the function call stack against the set of function based access control rules, and, if the function call is not permitted under the set of function based access control rules, then blocking the function call are performed within one or more virtual machines executing the framework for execution of the smart contract on the blockchain.

Clause 14. The system of Clause 8, where the set of function based access control rules includes at least one of a white list of allowed sequences of function calls and a black list of prohibited sequences of function calls.

Clause 15. One or more computer storage media having computer executable instructions stored thereon which, when executed by one or more processors, cause the processors to execute a method for system level function based access control for smart contract execution on a blockchain, the method comprising, in a kernel execution framework for smart contract execution on a blockchain, where the kernel execution framework is configured to perform function boundary detection: detecting a function call by one or more methods of a smart contract on the blockchain; adding the function call to a function call stack for the smart contract; checking the function call stack against a set of function based access control rules that defines one or more permitted or prohibited sequences of function calls; and if the function call stack includes one or more function calls that are not permitted under the set of function based access control rules, then blocking execution or completion of the function call.

Clause 16. The computer storage media of Clause 15, where: the function call stack includes each function called during execution of the smart contract; the set of function based access control rules includes at least one access control rule that defines a sequence of function calls; and the step of checking the function call stack against the set of function based access control rules includes checking the function call stack against the sequence of function calls defined in the access control rule that defines a sequence of function calls.

Clause 17. The computer storage media of Clause 15, where: the step of defining a set of function based access control rules includes at least one data based access control rule; the step of detecting a function call between one or more methods of a smart contract on the blockchain includes detecting at least one value included in the function call stack; the step of checking the function call stack against the set of function based access control rules includes checking the at least one value included in the function call stack against the data based access control rule; and the step of, if the sequence of function calls is not permitted under the set of function based access control rules, then blocking the function call, includes: if the at least one value included in the sequence of function calls is not permitted under the set of data based access control rules, then blocking the function call.

Clause 18. The computer storage media of Clause 15, where: the set of function based access control rules is stored on a blockchain; and the method includes modifying the set of function based access control rules by adding a function based access control rule block to the blockchain.

Clause 19. The computer storage media of Clause 15, wherein the kernel execution framework comprises a Linux operating system framework and the function boundary detection comprises extended Berkeley Packet Filtering.

Clause 20. The computer storage media of Clause 15, where the steps of detecting a function call by one or more methods of a smart contract on the blockchain, adding the function call to a function call stack for the smart contract, checking the function call stack against the set of function based access control rules, and, if the function call is not permitted under the set of function based access control rules, then blocking the function call are performed within one or more virtual machines executing the framework for execution of the smart contract on the blockchain.

Although the subject matter presented herein has been described in language specific to computer structural features, methodological and transformative acts, specific computing machinery, and computer readable media, it is to be understood that the subject matter set forth in the appended claims is not necessarily limited to the specific features, acts, or media described herein. Rather, the specific features, acts and mediums are disclosed as example forms of implementing the claimed subject matter.

The subject matter described above is provided by way of illustration only and should not be construed as limiting. Various modifications and changes can be made to the subject matter described herein without following the example configurations and applications illustrated and described, and without departing from the scope of the present disclosure, which is set forth in the following claims.

What is claimed is:

1. A computer-implemented method for system level function based access control for smart contract execution on a blockchain, the method comprising, in a kernel execution framework for smart contract execution on a blockchain, where the kernel execution framework is configured to perform function boundary detection:
    defining a set of function based access control rules that includes at least one data based access control rule that defines a sequence of function calls and a function call value that are prohibited;
    detecting a function call by one or more methods of a smart contract on the blockchain including detecting at least one value included in the function call;
    adding the function call to a function call stack for the smart contract, where the function call stack includes a sequence of functions called during execution of the smart contract;
    checking the function call stack against the sequence of function calls and the function call value defined in the data based access control rule; and
    if the function call stack includes the sequence of function calls and the function call value defined in the data based access control rule, then blocking execution or completion of the function call.

2. The computer-implemented method of claim 1, where:
    the set of function based access control rules is stored on a blockchain; and
    the method includes modifying the set of function based access control rules by adding a function based access control rule block to the blockchain.

3. The computer-implemented method of claim 1, wherein the kernel execution framework comprises a Linux operating system framework and the function boundary detection comprises extended Berkeley Packet Filtering.

4. The computer-implemented method of claim 1, where the steps of detecting a function call by one or more methods of a smart contract on the blockchain, adding the function call to a function call stack for the smart contract, checking the function call stack against the set of function based access control rules, and, if the function call stack includes the sequence of function calls and the function call value defined in the data based access control rule, then blocking execution or completion of the function call are performed within one or more virtual machines executing the framework for execution of the smart contract on the blockchain.

5. The computer-implemented method of claim 1, where the set of function based access control rules includes at least one of a white list of allowed sequences of function calls and a black list of prohibited sequences of function calls.

6. A system for system level function based access control for smart contract execution on a blockchain, the system comprising:
    one or more processors; and
    one or more memory devices in communication with the one or more processors, the memory devices having computer-readable instructions stored thereupon that, when executed by the processors, cause the processors to perform a method for system level function based access control for smart contract execution on a blockchain, the method comprising, in a kernel execution framework for smart contract execution on a blockchain, where the kernel execution framework is configured to perform function boundary detection:
    defining a set of function based access control rules that includes at least one data based access control rule that defines a sequence of function calls and a function call value that are prohibited;
    detecting a function call by one or more methods of a smart contract on the blockchain including detecting at least one value included in the function call;
    adding the function call to a function call stack for the smart contract, where the function call stack includes a sequence of functions called during execution of the smart contract;
    checking the function call stack against the sequence of function calls and the function call value defined in the data based access control rule; and
    if the function call stack includes the sequence of function calls and the function call value defined in the data based access control rule, then blocking execution or completion of the function call.

7. The system of claim 6, where:
    the set of function based access control rules is stored on a blockchain; and
    the method includes modifying the set of function based access control rules by adding a function based access control rule block to the blockchain.

8. The system of claim 6, wherein the kernel execution framework comprises a Linux operating system framework and the function boundary detection comprises extended Berkeley Packet Filtering.

9. The system of claim 6, where the steps of detecting a function call by one or more methods of a smart contract on the blockchain, adding the function call to a function call stack for the smart contract, checking the function call stack against the set of function based access control rules, and, if the function call stack includes the sequence of function calls and the function call value defined in the data based access control rule, then blocking execution or completion of the function call are performed within one or more virtual machines executing the framework for execution of the smart contract on the blockchain.

10. The system of claim 6, where the set of function based access control rules includes at least one of a white list of allowed sequences of function calls and a black list of prohibited sequences of function calls.

11. One or more non-transitory computer storage media having computer executable instructions stored thereon which, when executed by one or more processors, cause the processors to execute a method for system level function based access control for smart contract execution on a blockchain, the method comprising, in a kernel execution framework for smart contract execution on a blockchain, where the kernel execution framework is configured to perform function boundary detection:
    defining a set of function based access control rules that includes at least one data based access control rule that defines a sequence of function calls and a function call value that are prohibited;
    detecting a function call by one or more methods of a smart contract on the blockchain including detecting at least one value included in the function call;
    adding the function call to a function call stack for the smart contract, where the function call stack includes a sequence of functions called during execution of the smart contract;
    checking the function call stack against the sequence of function calls and the function call value defined in the data based access control rule; and if the function call stack includes the sequence of function calls and the function call value defined in the data based access control rule, then blocking execution or completion of the function call.

12. The computer storage media of claim 11, where:
the set of function based access control rules is stored on a blockchain; and
the method includes modifying the set of function based access control rules by adding a function based access control rule block to the blockchain.

13. The computer storage media of claim 11, wherein the kernel execution framework comprises a Linux operating system framework and the function boundary detection comprises extended Berkeley Packet Filtering.

14. The computer storage media of claim 11, where the steps of detecting a function call by one or more methods of a smart contract on the blockchain, adding the function call to a function call stack for the smart contract, checking the function call stack against the set of function based access control rules, and, if the function call stack includes the sequence of function calls and the function call value defined in the data based access control rule, then blocking execution or completion of the function call are performed within one or more virtual machines executing the framework for execution of the smart contract on the blockchain.

* * * * *